United States Patent
Myers et al.

(10) Patent No.: US 12,298,467 B2
(45) Date of Patent: May 13, 2025

(54) PLATFORM FOR PRODUCING ALERTS RELATED TO SEVERE WEATHER AND NON-WEATHER EVENTS

(71) Applicant: AccuWeather, Inc., College, PA (US)

(72) Inventors: Joel N. Myers, State College, PA (US); Scott Mackaro, Erie, CO (US); Chris Patti, State College, PA (US); Guy Pearson, Wichita, KS (US); Jonathan C. Porter, State College, PA (US); Michael Root, State College, PA (US); Steve Smith, State College, PA (US); Michael Steinberg, State College, PA (US)

(73) Assignee: AccuWeather, Inc.

( * ) Notice: Subject to any disclaimer, the term of this patent is extended or adjusted under 35 U.S.C. 154(b) by 0 days.

(21) Appl. No.: 17/830,962

(22) Filed: Jun. 2, 2022

(65) Prior Publication Data
US 2022/0390648 A1    Dec. 8, 2022

Related U.S. Application Data

(60) Provisional application No. 63/195,814, filed on Jun. 2, 2021.

(51) Int. Cl.
| | |
|---|---|
| *G01W 1/10* | (2006.01) |
| *H04W 4/02* | (2018.01) |
| *H04W 4/021* | (2018.01) |
| *H04W 4/12* | (2009.01) |
| *H04W 4/90* | (2018.01) |

(52) U.S. Cl.
CPC .......... *G01W 1/10* (2013.01); *H04W 4/021* (2013.01); *H04W 4/023* (2013.01); *H04W 4/12* (2013.01); *H04W 4/90* (2018.02); *G01W 2203/00* (2013.01)

(58) Field of Classification Search
CPC ... G01W 1/10; G01W 2203/00; H04W 4/021; H04W 4/023; H04W 4/12; H04W 4/90
See application file for complete search history.

(56) References Cited

U.S. PATENT DOCUMENTS

| | | | | | |
|---|---|---|---|---|---|
| 5,517,193 | A | * | 5/1996 | Allison | G01W 1/02 |
| | | | | | 702/3 |
| 6,339,747 | B1 | * | 1/2002 | Daly | G01W 1/10 |
| | | | | | 702/3 |
| 6,498,987 | B1 | * | 12/2002 | Kelly | G06Q 30/02 |
| | | | | | 702/3 |
| 9,691,288 | B2 | * | 6/2017 | Agrawal | B64D 45/00 |
| 9,760,805 | B2 | * | 9/2017 | Wang | G06T 7/20 |
| 11,009,625 | B2 | * | 5/2021 | Eckel | G06N 5/04 |
| 2006/0015254 | A1 | * | 1/2006 | Smith | H04W 4/02 |
| | | | | | 340/905 |
| 2006/0267783 | A1 | * | 11/2006 | Smith | G01W 1/00 |
| | | | | | 340/601 |
| 2017/0075032 | A1 | * | 3/2017 | Heisler | G08B 21/10 |
| 2017/0357920 | A1 | * | 12/2017 | Stewart | G01W 1/10 |
| 2018/0302481 | A1 | * | 10/2018 | Lee | H04L 43/08 |
| 2019/0018918 | A1 | * | 1/2019 | Wood | G06F 17/18 |

\* cited by examiner

*Primary Examiner* — John A Tweel, Jr.

(57) ABSTRACT

A first device may receive data inputs from data sources corresponding to raw weather, non-weather, and/or environmental data. The first device may generate targeted alerts based on the data inputs and transmit the targeted alerts to a second device associated with a user.

26 Claims, 31 Drawing Sheets

Alert System Overview

Alert System Overview

Data Input Examples

FIGURE 2
Observed Weather Data

101a

Doppler Radar

Data Input Examples

FIGURE 5
Historical Weather Data

Data Input Examples
Historical Ensemble Model Runs

Data Input Examples

Historical Analog Input
(e.g. Hurricane Data from prior years)

Data Input Examples
FIGURE 9
Historical Global/Regional Re-analysis / Re-forecast
Revised flooding forecast, Afghanistan
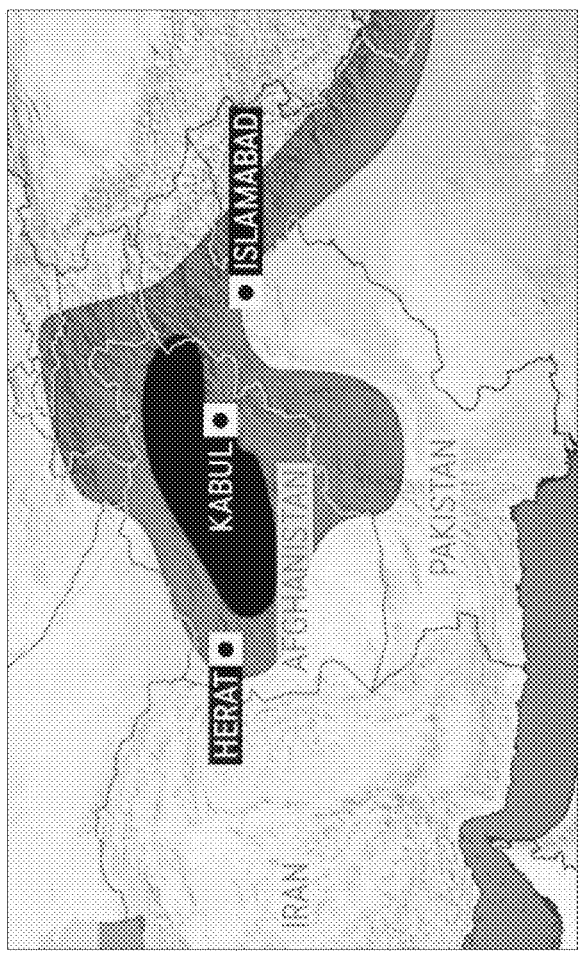
106
Patterns Provided by Meteorologists
Weather Forecast, North America
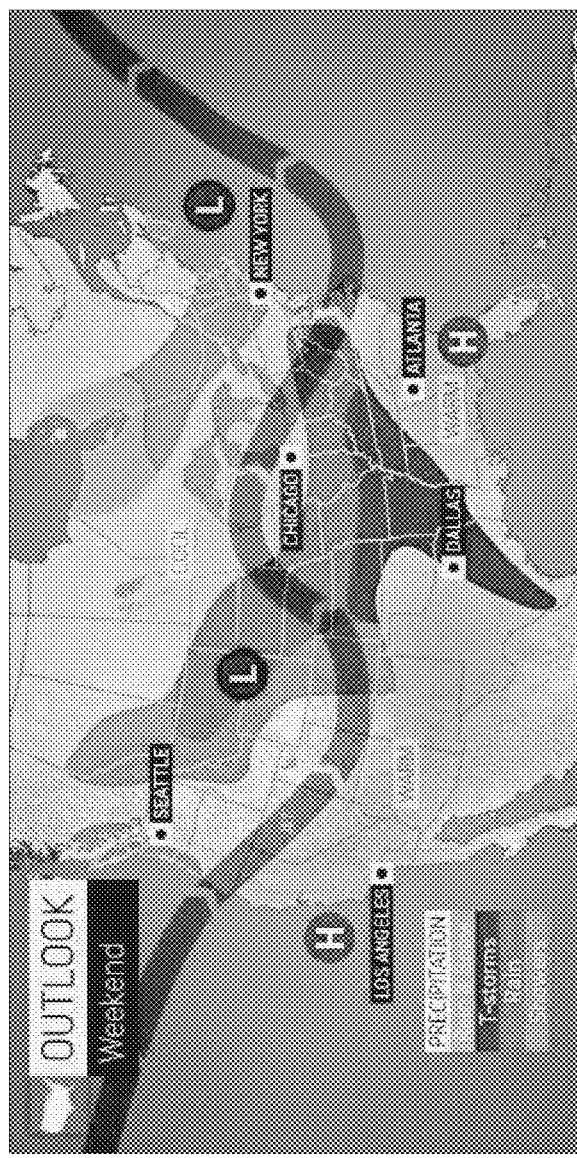
107

Data Input Examples
FIGURE 10
Third Party Datasets

U.S. Earthquake Data
(Textural)

|   | A | B | C | D | E | F |
|---|---|---|---|---|---|---|
|   | TIME | LAT. | LONG. | DEPTH (KM) | MAG | TYPE |
| 2 | 2021-050-06T13:54:32.740Z | 35.988 | -97.9578 | 5.32 | 2.08 | earthquake |
| 3 | 2021-050-06T13:30:05.530Z | 36.36217 | -98.1498 | 6.77 | 2.22 | earthquake |
| 4 | 2021-050-06T10:30:51.679Z | 35.98717 | -97.9605 | 4.33 | 1.76 | earthquake |
| 5 | 2021-050-06T10:18:30.820Z | 35.99067 | -97.9627 | 5.07 | 1.36 | earthquake |
| 6 | 2021-050-06T08:43:00.870Z | 35.989 | -97.9593 | 5.18 | 1.63 | earthquake |
| 7 | 2021-050-06T08:38:04.540Z | 35.988 | -97.9625 | 4.76 | 1.36 | earthquake |
| 8 | 2021-050-06T08:05:35.250Z | 35.99 | -97.9598 | 4.95 | 1.52 | earthquake |
| 9 | 2021-050-06T14:16:28.489Z | 35.99067 | -97.957 | 4.17 | 1.28 | earthquake |
| 10 | 2021-050-05T11:08:24.140Z | 35.12067 | -95.3823 | 7.26 | 0.87 | earthquake |
| 11 | 2021-050-05T10:03:53.369Z | 35.4995 | -97.0118 | 6.32 | 1.2 | earthquake |
| 12 | 2021-050-05T09:12:20.280Z | 35.58683 | -97.3967 | 6.84 | 0.67 | earthquake |
| 13 | 2021-050-05T03:36:24.809Z | 36.69867 | -97.6752 | 7.58 | 2.26 | earthquake |
| 14 | 2021-050-05T03:14:59.640Z | 34.4085 | -97.4912 | 8.38 | 1.36 | earthquake |
| 15 | 2021-050-05T02:23:19.140Z | 34.3965 | -97.4895 | 8.75 | 1.14 | earthquake |
| 16 | 2021-050-05T00:50:35.600Z | 36.69417 | -97.6773 | 5 | 1.19 | earthquake |
| 17 | 2021-050-04T21:59:25.339Z | 35.15067 | -95.3348 | 6.05 | 2.16 | earthquake |

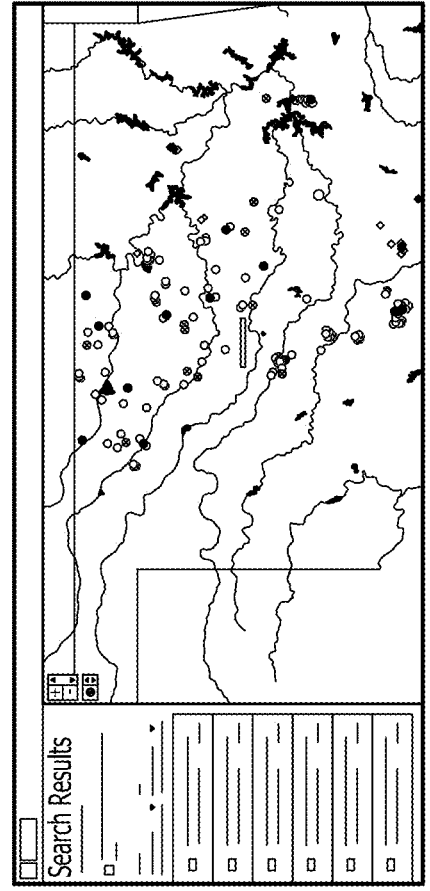

U.S. Earthquake Data
(Graphical)

Data Input Examples

FIGURE 11
Targeted Output Locations;
Alert Criteria

| Client / User | LAT. | LONG. | ZIP CODE | CRITERION A | CRITERION B | CRITERION C | CRITERION D |
|---|---|---|---|---|---|---|---|
| AA-001 | 34.4253 | -97.457 | | 1.5 | 50.00% | 25 | 45 |
| AA-002 | 35.9243 | -97.3373 | | 1.5 | 50.00% | 25 | 45 |
| AA-003 | 34.4157 | -97.4452 | | 1.5 | 50.00% | 30 | 40 |
| AA-004 | 34.4401 | -97.4183 | | 1.5 | 50.00% | 30 | 40 |
| AA-005 | 35.1238 | -95.3732 | | 1.5 | 50.00% | 30 | 40 |
| AA-006 | 35.497 | -97.0097 | | 1.5 | 50.00% | 30 | 40 |
| BA-001 | | | 68231 | 2.3 | | 20 | 28 |
| BA-002 | | | 62335 | 2.3 | | 20 | 28 |
| BA-003 | | | 62340 | 2.3 | | 20 | 28 |
| BA-004 | | | 62343 | 2.3 | | 20 | 28 |
| BA-005 | | | 62350 | 2.3 | | 20 | 28 |
| BA-006 | | | 62353 | 2.3 | | 20 | 28 |
| BA-007 | | | 62360 | 2.3 | | 20 | 28 |
| BA-008 | | | 73034 | 2.3 | | 20 | 28 |
| BA-009 | | | 73234 | 2.3 | | 20 | 28 |
| BA-010 | | | 73434 | 2.3 | | 20 | 28 |
| BA-011 | | | 73634 | 2.3 | | 20 | 28 |
| BA-012 | | | 73634 | 2.3 | | 20 | 28 |
| BA-013 | | | 74034 | 2.3 | | 20 | 28 |
| BA-014 | | | 74234 | 2.3 | | 20 | 28 |
| BA-015 | | | 74434 | 2.3 | | 20 | 28 |
| BA-016 | | | 74634 | 2.3 | | 20 | 28 |
| CA-001 | 45.3265 | -124.569 | | 4.86 | 25.00% | 15 | 33 |
| CA-002 | 45.3415 | -124.591 | | 5.35 | 25.00% | 15 | 33 |
| CA-003 | 45.3565 | -124.613 | | 8.56 | 25.00% | 15 | 33 |
| CA-004 | 45.3715 | -124.635 | | 7.63 | 25.00% | 15 | 33 |

109

110

Unique Client/User Data
(Sensors on a Tower at a Wind Farm)

Data Input Examples

FIGURE 13
Government Provided Warning

Red Flag Warning

URGENT - FIRE WEATHER MESSAGE
National Weather Service Grand Forks ND
315 AM CDT Thu May 6 2021

NDZ001>009-013>017-022>024-027>032-040-MNZ006>008-014>016-024-
026>028-030-033-040-051>054-070180-
/O.UPG.KGFK.FW.A.0004.210506T1700Z-210507T0100Z/
/O.NEW.KGFK.FW.W.0007.210506T1700Z-210507T0100Z/
West Polk-Norman-Clay-Kittson-Roseau-Lake Of The Woods-
West Marshall-East Marshall-North Beltrami-Pennington-Red Lake-
East Polk-North Clearwater-South Beltrami-Mahnomen-
South Clearwater-Hubbard-West Becker-East Becker-Wilkin-
West Otter Tail-East Otter Tail-Cavalier-Grant-Towner-Cavalier-
Pembina-Benson-Ramsey-Eastern Walsh-Eddy-Nelson-Grand Forks-
Griggs-Steele-Traill-Barnes-Cass-Ransom-Sargent-Richland-
Western Walsh-
315 AM CDT Thu May 6 2021

...RED FLAG WARNING IN EFFECT FROM NOON TODAY TO 8 PM CDT THIS
EVENING FOR GUSTY WINDS AND LOW RELATIVE HUMIDITY FOR ALL OF
EASTERN NORTH DAKOTA AND NORTHWEST AND WEST CENTRAL MINNESOTA...

The National Weather Service in Grand Forks has issued a Red Flag
Warning for gusty winds and low relative humidity, which is in
effect from noon today to 8 PM CDT this evening. The Fire Weather
Watch is no longer in effect.

* AFFECTED AREA...In Minnesota...Fire Weather Zones 001...002...
  003...004...005...006...007...008...009...013...014...015...
  016...017...022...023...024...027...028...029...030...031...
  032 and 040. In North Dakota...Fire Weather Zones 006...007...
  008...014...015...016...024...026...027...028...029...030...
  033...040...051...052...053 and 054.

* TIMING...Thursday afternoon through Thursday evening.

* WINDS...Northwest 15 to 30 mph with gusts up to 40 mph.

* RELATIVE HUMIDITY...As low as 15 to 20 percent.

* IMPACTS...Any fires that ignite will spread rapidly and become
  difficult to control or suppress.

PRECAUTIONARY/PREPAREDNESS ACTIONS...

A Red Flag Warning means that critical fire weather conditions
are either occurring now, or will shortly. A combination of
strong winds, low relative humidity, and warm temperatures can
contribute to extreme fire behavior.

↙ 113

Data Input Examples

Other (mPING data display)

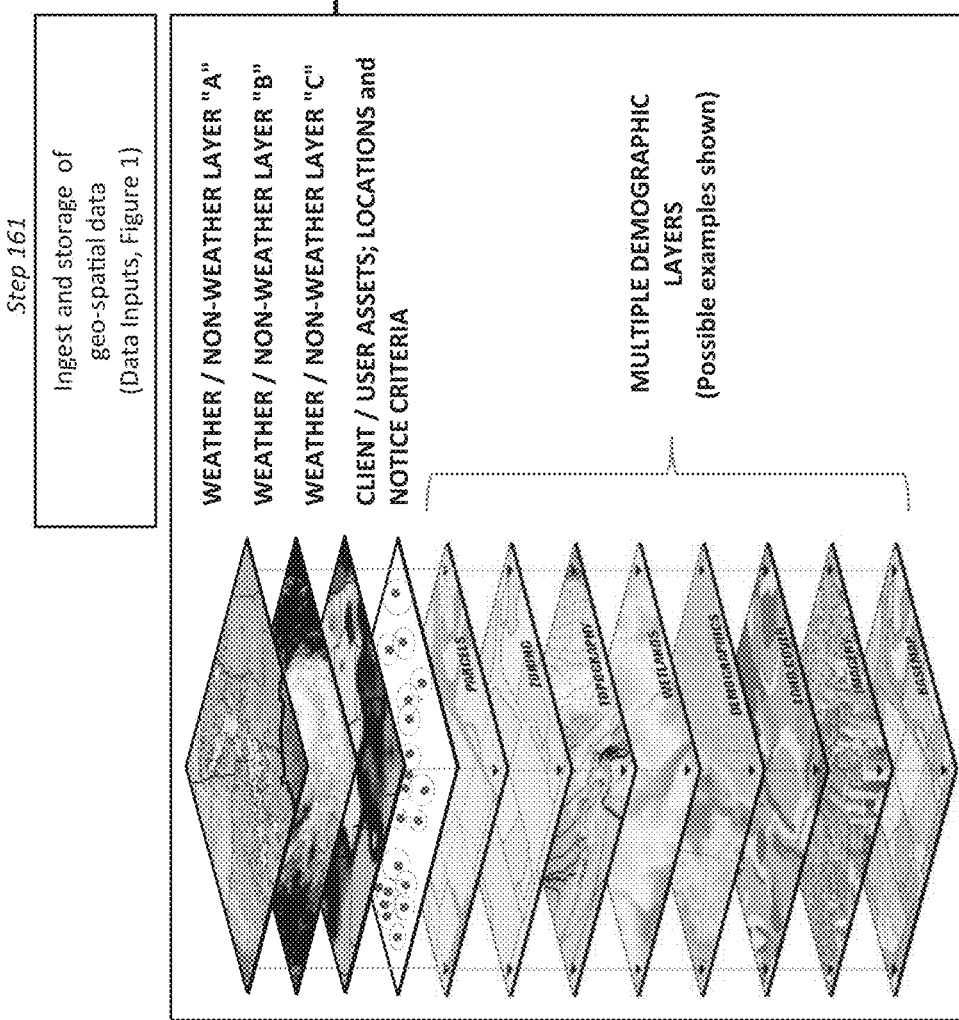

"Tap on the Shoulder"
EXAMPLE
FIGURE 17

Certain Client/User Locations may be co-located in an area with developing blizzard conditions:

Developing Blizzard Conditions:

Are Snowfall rates > 2" / Hr.:    YES

Are Wind Gusts > 35 mph:    Approaching

Are Temperature < 20 deg F:    Approaching

Are Visibilities < 1/4 mile:    Approaching

Co-located with Client / User Locations:    YES

CONTINUE TO MONITOR CONDITIONS, STAND BY READY TO ISSUE A PTI ALERT

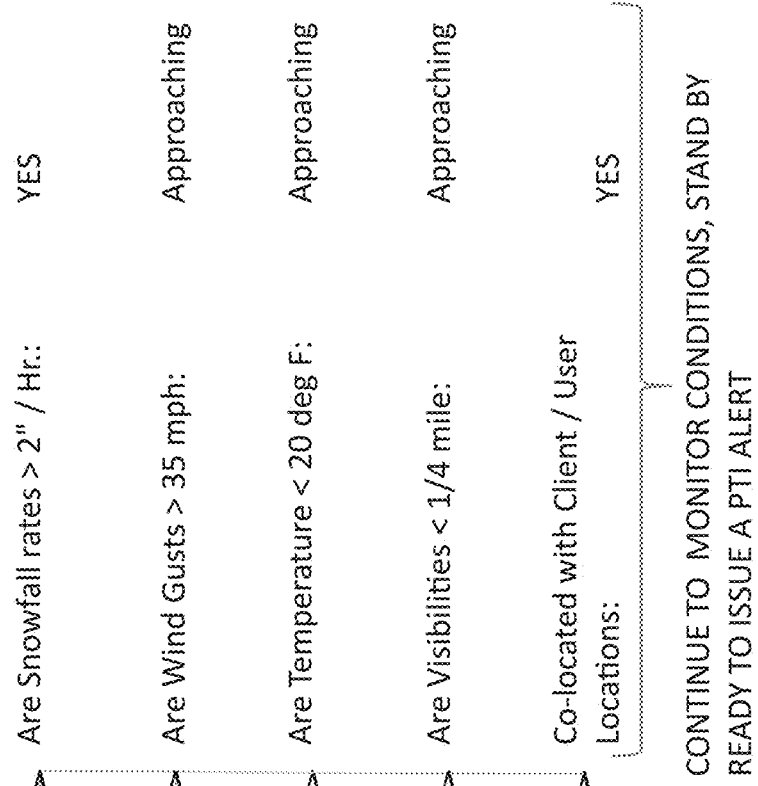

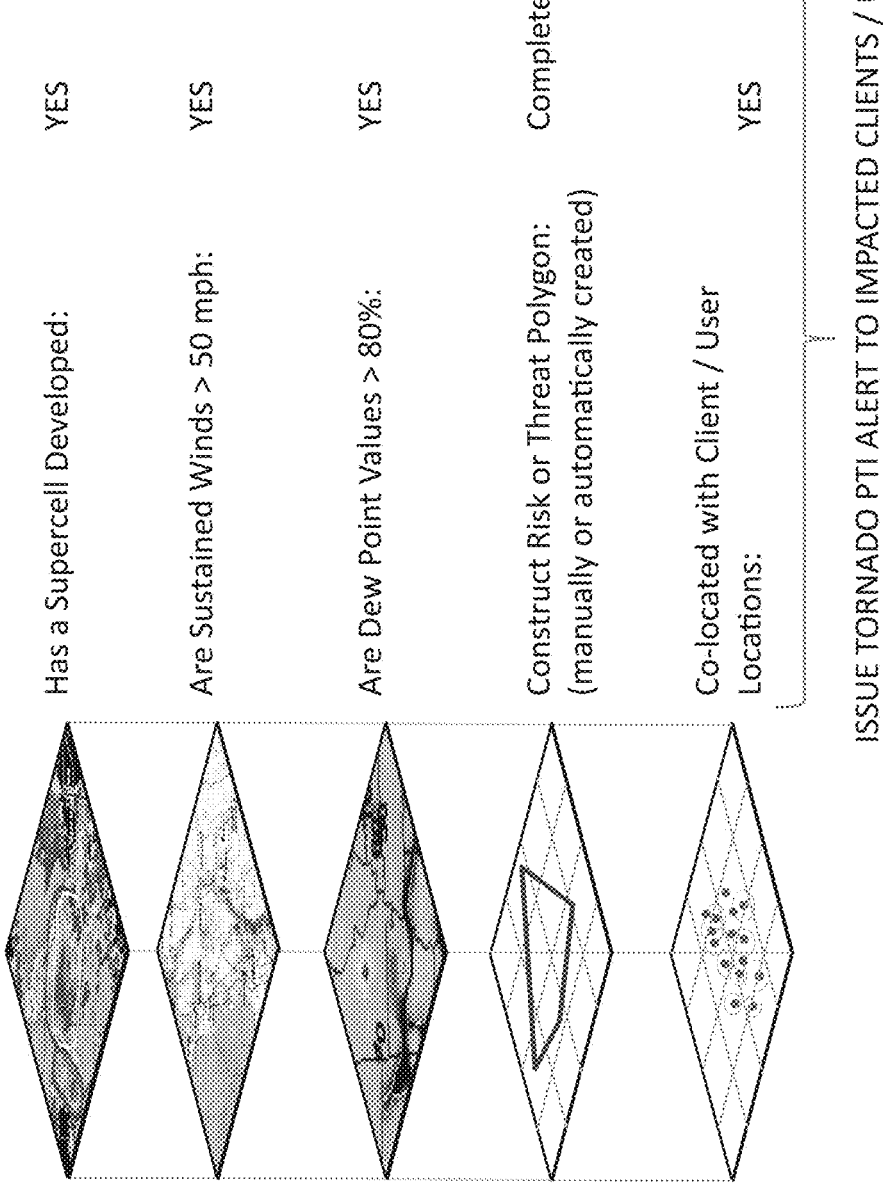

PTI Alert Generation

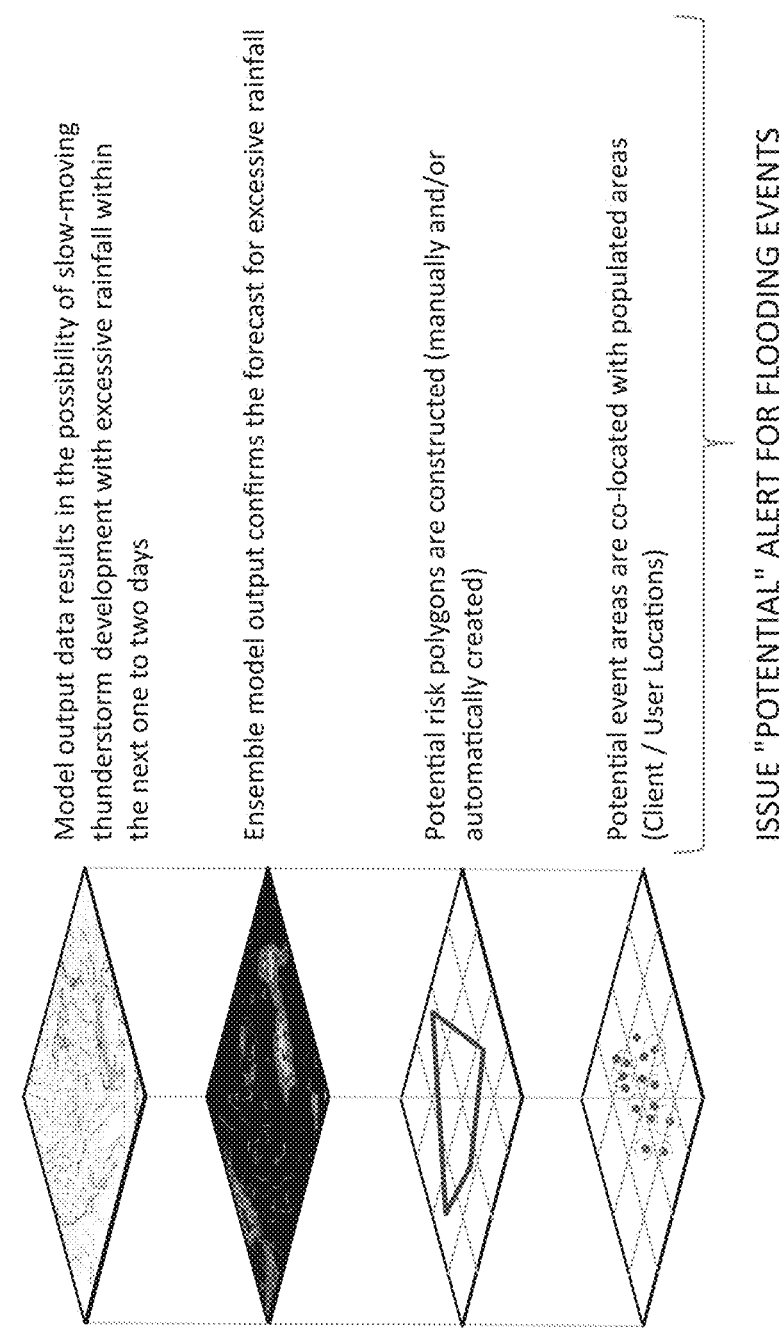

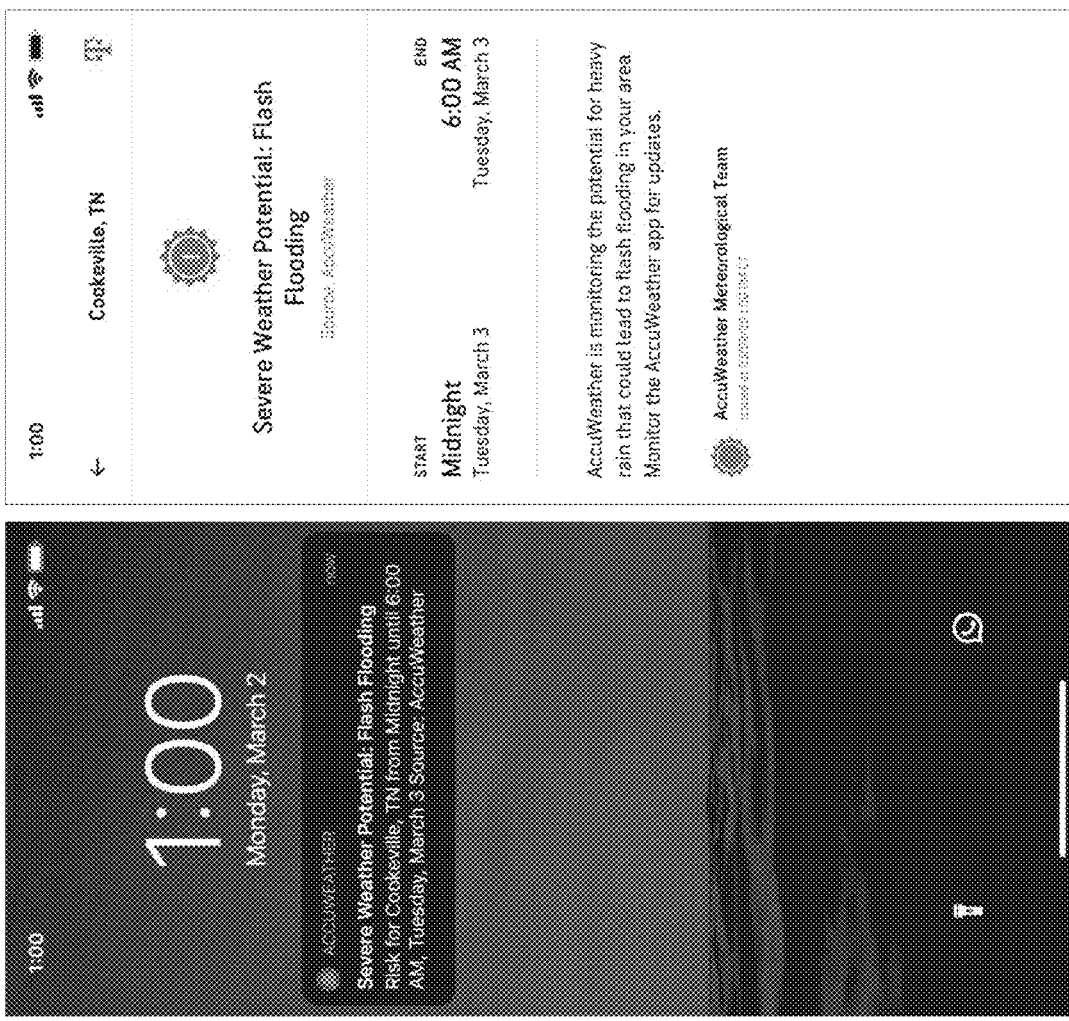

"PTI" Alerts
"Threat" Alert Schematic
FIGURE 22

A forecast for thunderstorms with excessive rainfall that could produce significant flooding events:

Model output data results in the development of slow-moving thunderstorms for today in the early morning hours Ensemble model output confirms the forecast for excessive rainfall State geologists confirm local soils are saturated Doppler Radar illustrates severe thunderstorms have formed locally State hydrologists confirm drainage systems have reached their capacity Threat risk polygons are constructed (manually or automatically created)

Threat event areas are co-located with populated areas (Client / User Locations

ISSUE "THREAT" ALERT FOR FLOODING EVENTS WITHIN THE NEXT 6 HOURS

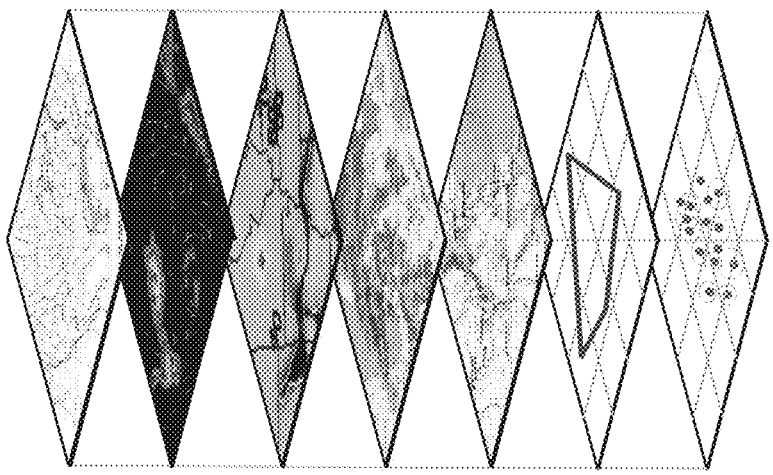

PTI Alert Example

"Threat" Alert

PTI Alert Example

"Imminent" Alert

PTI Alert Examples

Presenting Distinctive
Layouts, Text, Emojis, icons, etc.

[ mock-up ]

PTI Alert Examples

Average Number of Tornadoes per year. Custom Alert wording based on topography. Lack of significant topography allows the collision of two air masses in the mid-continent creating abundant Tornadoes.

PTI Alert Examples

Custom Alert wording: arroyo drainage system vs. areas with established drainage canals

PLATFORM FOR PRODUCING ALERTS RELATED TO SEVERE WEATHER AND NON-WEATHER EVENTS

CROSS-REFERENCE TO RELATED APPLICATIONS

This application claims the benefit of U.S. Provisional Application No. 63/195,814, filed Jun. 2, 2021. The entire disclosure of which is incorporated herein by reference.

STATEMENT REGARDING FEDERALLY SPONSORED RESEARCH OR DEVELOPMENT

The present invention was not developed with the use of any Federal Funds, but was developed independently by the inventors.

BACKGROUND

1. Field

The present invention relates to producing alerts, and in particular, to producing severe weather and non-weather alerts to a client or user and/or the public that addresses the risks and impacts from severe weather and non-weather events. In some implementations, the alerts are compartmentalized to specific time periods and hyper-localized to specific geographical areas and employ "push technologies" to send the alerts to the recipients. In some implementations, the alerts communicate specific information about the severe weather and non-weather event in a consistent message (regardless of the event type) that is easily understood by the public, following systematic "Potential, Threat, Imminent" alerting ("PTI") protocols, as described in greater detail below. In some implementations, the alerts convey the appropriate actions and recommendations to undertake for those located in the specific area covered by the alert to minimize the loss of life and damage to property.

2. Background

In recent years, the pervasive use of wireless devices has exploded, even to the point where nearly every adult may have a wireless device in his or her possession at any given time. Also, in recent years, the number and severity of extreme weather and non-weather events has been increasing. The public has countless outlets and resources for receiving information related to severe weather and non-weather events via wireless networks. However, most of the outlets operating today lack localization (they detail the event across large areas, typically covering one or more counties rather than the location of a User), a high degree of forecast detail (the nature and impact of each event), the timely release of the alert well in advance of the event to allow for the implementation of appropriate response(s) to the event, and a lack of uniformity and continuity in the message resulting in a poor degree of comprehension by the public. Furthermore, there are certain severe weather events where the National Weather Service (NWS) does not release any warnings at all, such as hail events and the like. As the frequency and severity of extreme weather and non-weather events has increased, however, there has also been an increase in demand from the public for accurate, timely, and hyper-local alerts related to severe weather and non-weather events. These issues give rise to the present invention.

In the past, weather and non-weather alerts have been generated and disseminated primarily by two sources: a) those released by government agencies as a public service covering a broad range of weather and non-weather events; and b) those released by private-sector weather services companies and professional meteorologists to their clients who pay for the service. Government agencies have utilized and relied upon government-controlled data collection systems, such as weather observation stations, radar and satellite imagery, and other data sources. Additionally, private-sector weather services companies and professional Meteorologists rely mostly on alerts from government sources to serve the needs of their clients.

In the past, alerting solutions have not: a) provided the location granularity of the severe weather and non-weather event to only warn those people in imminent danger; b) systematically condensed the alert to a specific increment of time only to warn those people in imminent danger and provide the alerts with sufficient lead time as possible to allow those who are impacted to implement the appropriate response(s); and c) created the alerts using lay language allowing for the easy assimilation of the alert message and the comprehension of the necessary and appropriate response(s) to implement. In fact, the alerts have been issued covering much larger areas and those not impacted by the specific event have tended to dismiss and ignore the warning as not applying to them. Additionally, past alerts have been written in a variety of formats utilizing confusing, technical jargon. As a result, poor response measures were enacted and people and property were adversely impacted.

The advisories, watches, and warnings provided by other commercial weather services providers, as well as those from government sources, lack the location and timing specificity when compared to those produced from this invention. Furthermore, these alerts are confusing due to how they are constructed and presented, i.e., essentially employing the same format to present advisories (lower risk), watches (added risk), and warnings (higher risk) even though the message should be suitably different in each category and nature of the alert. By reducing all ingested content through Applicants' curation and normalization processes to arrive at the key data elements, any inherited bias or ambiguity is removed. As a result, Applicants' alerts, hereinafter termed "Alerts," will be consistently formatted to convey a "Potential" for an event (normally days in advance), the "Threat" of an event (normally hours in advance), or an "Imminent" event (normally minutes to an hour in advance); all with the easy to comprehend language contained in the Alert describing its nature and the actions needed to be taken to eliminate or reduce property damage and loss of life (examples are shown in FIGS. 21, 23, and 25).

The Alerts are further improved and enhanced by customizing the message of each Alert with the aid of additional "data layers," such as geo-spatial layers, which account for such attributes as, without limitation, the unique area risk profiles, social-economic conditions, demographics, and the geography of the area targeted by the Alert. These data layers are either constructed in-house by Applicants' personnel (by digitizing hard copy information) or the data is downloaded or purchased from commercial third parties and customized for use in these processes. Examples of these data layers are shown in FIGS. 16-18, and FIGS. 20, 22, and 24, and can include, without limitation, existing map and data layers provided by U.S. Geological Survey and ESRI. The data for these layers is primarily ingested digitally into the Software Management Platforms through various routines and may be periodically updated.

An example of another data layer that may be used in the construction of the Alerts is the unique meteorological factors of certain areas that allow for the tailoring of the Alert messaging to be location specific. An example includes the unique topography of an area, such as the central plains that allows for the development of tornadoes during severe thunderstorms allowing for the tornadoes to develop sooner than it normally would in areas having different topographies, such as shown in FIG. 27.

In yet another example, using housing data, an Alert regarding a tornado warning may be significantly modified for a housing area comprising densely placed, prefabricated housing units as opposed to another area where the homes may be constructed of rock and brick, on acreage, and large enough to contain one or more interior safe rooms as shown in FIG. 28.

In yet another example, an Alert for a flash flood warning may be constructed differently for an area in the desert southwest where the landscape comprises numerous arroyos (causing landslides and debris flows with flooding) as opposed to a vegetated area with ample and active drainage corridors as shown in FIG. 29. The curation and normalization and other processes (See FIGS. 1 and 15) described in the examples above allow for the construction of Alerts with highest accuracy and location specificity.

As stated in greater detail below, the present invention utilizes customized technologies of Applicant to help identify and locate areas impacted by severe weather and non-weather events. These technologies comprise software processes that ingest data and content in many formats, from a variety of sources, and transform the content into usable, raw components that are reformatted for use in the Software Management Platforms. The reformatted data are used to create internal computer forecast models, transformative processes, and other products, which are utilized by meteorologists in charge of monitoring and assessing severe weather and non- weather events. The Platform management system of the present invention allows the meteorologists to model various outcome scenarios based on historical severe weather and non-weather events, and result in the most accurate forecasts for severe weather and non-weather events much sooner and more reliably than any other weather services provider or government agency.

The Software Management Platform of the present invention comprises a complete real-time visualization toolkit utilized for the review and assessment of severe weather events, natural hazards, and environmental impacts. Examples of these hazards and impacts include, without limitation, wildfires, earthquakes and landslides, events that could affect air quality, and the like.

A forecasting team of meteorologists, having access to the Software Management Platform in real-time, together with the team's training of the genesis and evolution of severe weather and non-weather events, are capable of developing the Alerts with hyper-local precision and with precise timing. Once an event has been identified by the team, the team is able to accurately project the path of the event in space and time with the Software Management Platform to an extent never before possible. This scenario is repeatable for all severe weather and non-weather events by the team of meteorologists, utilizing datasets and rules-based modeling processes, along with weather pattern recognition based on historical severe weather and non-weather events. The present invention allows meteorologists to delineate areas of severe weather and non-weather risk much earlier than other weather services providers, as well as providing greater clarity in forecasts of the serve weather and non-weather event as it evolves through time.

SUMMARY

In some implementations, a first device may include one or more processors to receive data inputs from data sources corresponding to raw weather, non-weather, and/or environmental data. The first device may generate targeted alerts based on the data inputs and transmit the targeted alerts to a second device associated with a user. The one or more processors may be further utilized to curate and perform normalization processes on the data inputs to extract key data elements. The one or more processors may be further utilized to inform and alert meteorologists as to when additional weather or non-weather observations critical in the forecasting of weather or non-weather events that affect the targeted alerts. The data sources may include criteria or thresholds unique to a location of each user or a location of an asset of the user, including a) a time in advance of an identified event; b) a distance proximity of an identified event; and/or c) a threshold breach of a qualifier to an identified event to determine whether the risk locations are coincident with a client or a user location and/or threshold. The one or more processors may be further utilized to display available information in a graphical format and allow for a situational awareness of the current state of the weather and the environment. The data sources may include one or more of the following: observed weather data sources, doppler radar, historical weather data sources, historical model runs and resulting forecasts, historical ensemble model runs and resulting forecasts, historical analog inputs, historical global/regional re-analyses/re-forecasts, patterns provided by meteorologists, datasets that represent the locations of the user or a physical asset of a user.

In some implementations, a method may include receiving by a first device data inputs from data sources corresponding to raw weather, non-weather, and/or environmental data. The method may further include generating targeted alerts based on the data inputs and transmitting the targeted alerts to a second device associated with a user. The method may include curating and performing normalization processes on the data inputs to extract key data elements. The method may further include informing and alerting meteorologists as to when additional weather or non-weather observations critical in the forecasting of a weather or non-weather events that affect the targeted alerts. The data source may further include criteria or thresholds unique to a location of each user or a location of an asset of the user, including a) a time in advance of an identified event; b) a distance proximity of an identified event; and/or c) a threshold breach of a qualifier to an identified event to determine whether the risk locations are coincident with a client or a user location and/or threshold. The method may include displaying available information in a graphical format and allow for a situational awareness of the current state of the weather and the environment. The data sources may include one or more of the following: observed weather data sources, doppler radar, historical weather data sources, historical model runs and resulting forecasts, historical ensemble model runs and resulting forecasts, historical analog inputs, historical global/regional re-analyses/re-forecasts, patterns provided by meteorologists, datasets that represent the locations of the user or a physical asset of a user.

In some implementations, a non-transitory computer-readable medium storing instructions, the instructions may include one or more instructions that, when executed by one or more processors, cause the one or more processors to receive by a first device data inputs data inputs from data sources corresponding to raw weather, non-weather, and/or environmental data. The instructions may cause the processers to generate targeted alerts based on the data inputs and transmit the targeted alerts to a second device associated with a user. The instructions may cause the processers to curate and perform normalization processes on the data inputs to extract key data elements. The instructions may cause the processers to inform and alert meteorologists to when additional weather or non-weather observations critical in the forecasting of a weather or non- weather events that affect the targeted alerts. The data sources may include criteria or thresholds unique to a location of each user or a location of an asset of the user, including a) a time in advance of an identified event; b) a distance proximity of an identified event; and/or c) a threshold breach of a qualifier to an identified event to determine whether the risk locations are coincident with a client or a user location and/or threshold. The instructions may cause the processers to display available information in a graphical format and allow for a situational awareness of the current state of the weather and the environment. The data sources may include one or more of the following: observed weather data sources, doppler radar, historical weather data sources, historical model runs and resulting forecasts, historical ensemble model runs and resulting forecasts, historical analog inputs, historical global/regional re-analyses/re-forecasts, patterns provided by meteorologists, datasets that represent the locations of the user or a physical asset of a user.

BRIEF DESCRIPTION OF THE DRAWINGS

The embodiments will be described in detail with reference to the following drawings in which like reference numerals refer to like elements wherein:

FIG. 2 is a diagram of an example Observed Weather Data Source in accordance with the example implementation of FIG. 1;

FIG. 5 is a diagram of an example Historical Weather Data Source in accordance with the example implementation of FIG. 1;

FIG. 9 is a diagram of an example Historical Global/Regional Re-analysis/Re-forecast Data Source in accordance with the example implementation of FIG. 1;

FIG. 10 is a diagram of an example Third Party Datasets Data Source in accordance with the example implementation of FIG. 1;

FIG. 11 is a diagram of an example Targeted Output Locations Data Source in accordance with the example implementation of FIG. 1;

FIG. 13 is a diagram of an example Government Provided Warning Data Source in accordance with the example implementation of FIG. 1;

FIG. 16 is a diagram of an example "Tap on the Shoulder" and Rules-Based Analyses in accordance with the example implementation of FIG. 1;

FIG. 17 is a diagram of an exemplary "Tap on the Shoulder" analysis in accordance with the example implementation of FIG. 1;

FIG. 18 is a diagram of an exemplary "Rules-Based" analysis in accordance with the example implementation of FIG. 1;

FIG. 20 is a schematic of an example Potential PTI Schematic in accordance with the example implementation of FIG. 1;

FIG. 21 is an example Potential PTI Alert in accordance with the example implementation of FIG. 1;

FIG. 22 is a schematic of an example PTI Threat Alert Schematic in accordance with the example implementation of FIG. 1;

DETAILED DESCRIPTION

The following detailed description of example implementations refers to the accompanying drawings. The same reference numbers in different drawings may identify the same or similar elements.

A user, using a user device, receives severe weather and non-weather event Alerts from a management platform accessing one or more data sources, as described in greater detail below. Some implementations described herein permit the management platform to process data from the data sources to generate the Alerts, as described in greater detail below.

Figure 1:
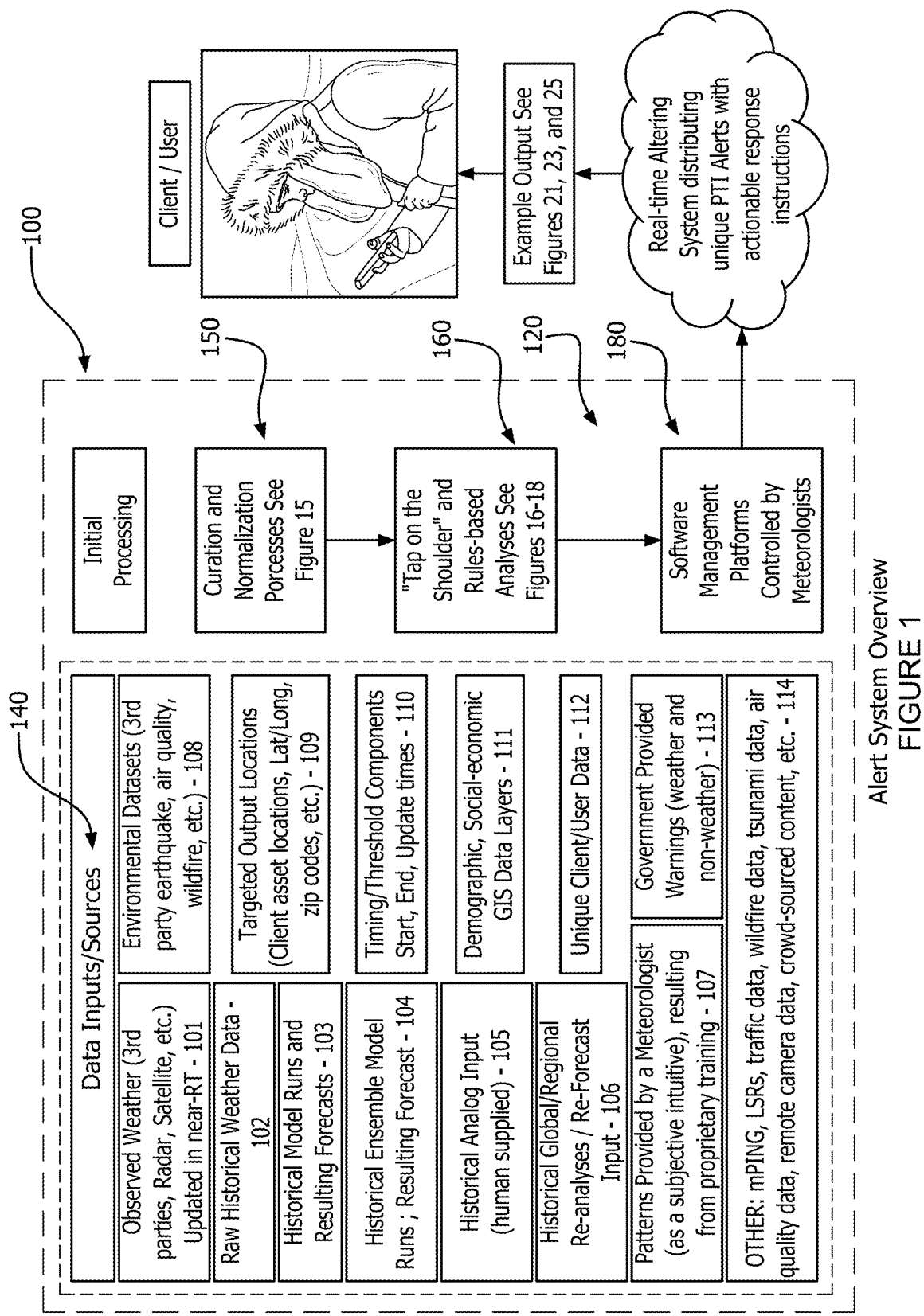
FIG. 1 is a diagram of an overview of an example implementation described herein.
Figure 23:
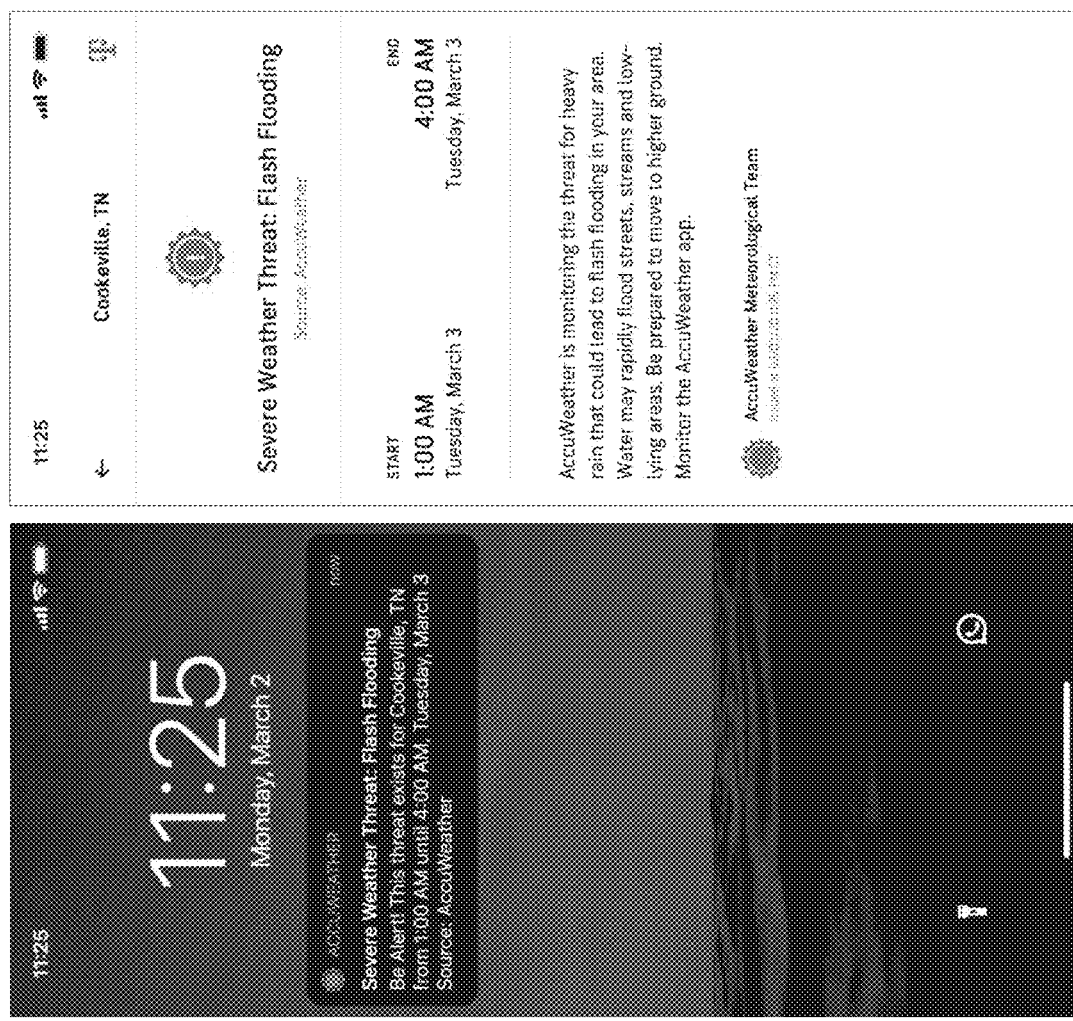
FIG. 23 is an example PTI Threat Alert in accordance with the example implementation of FIG. 1.
Figure 24:
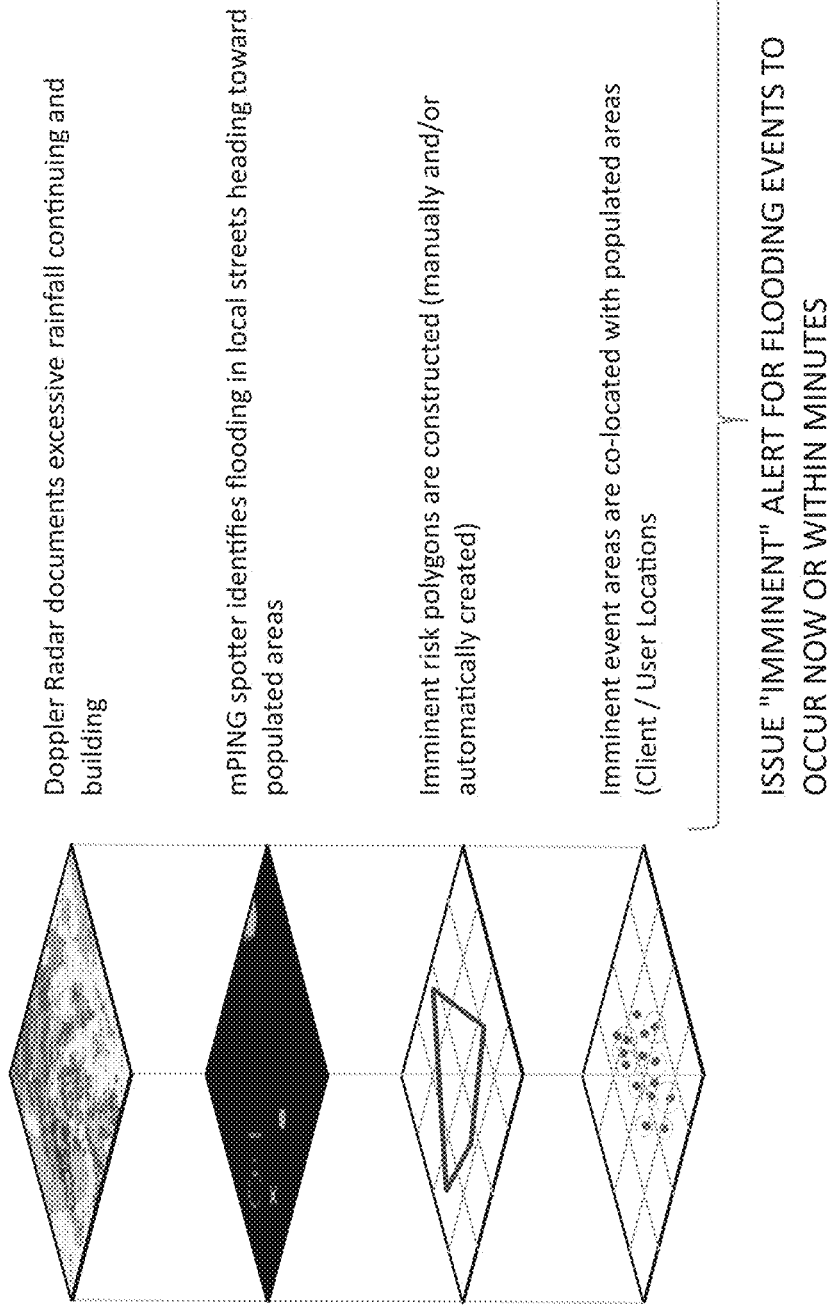
FIG. 24 is a schematic of an example PTI Imminent Alert Schematic in accordance with the example implementation of FIG. 1.
Figure 25:
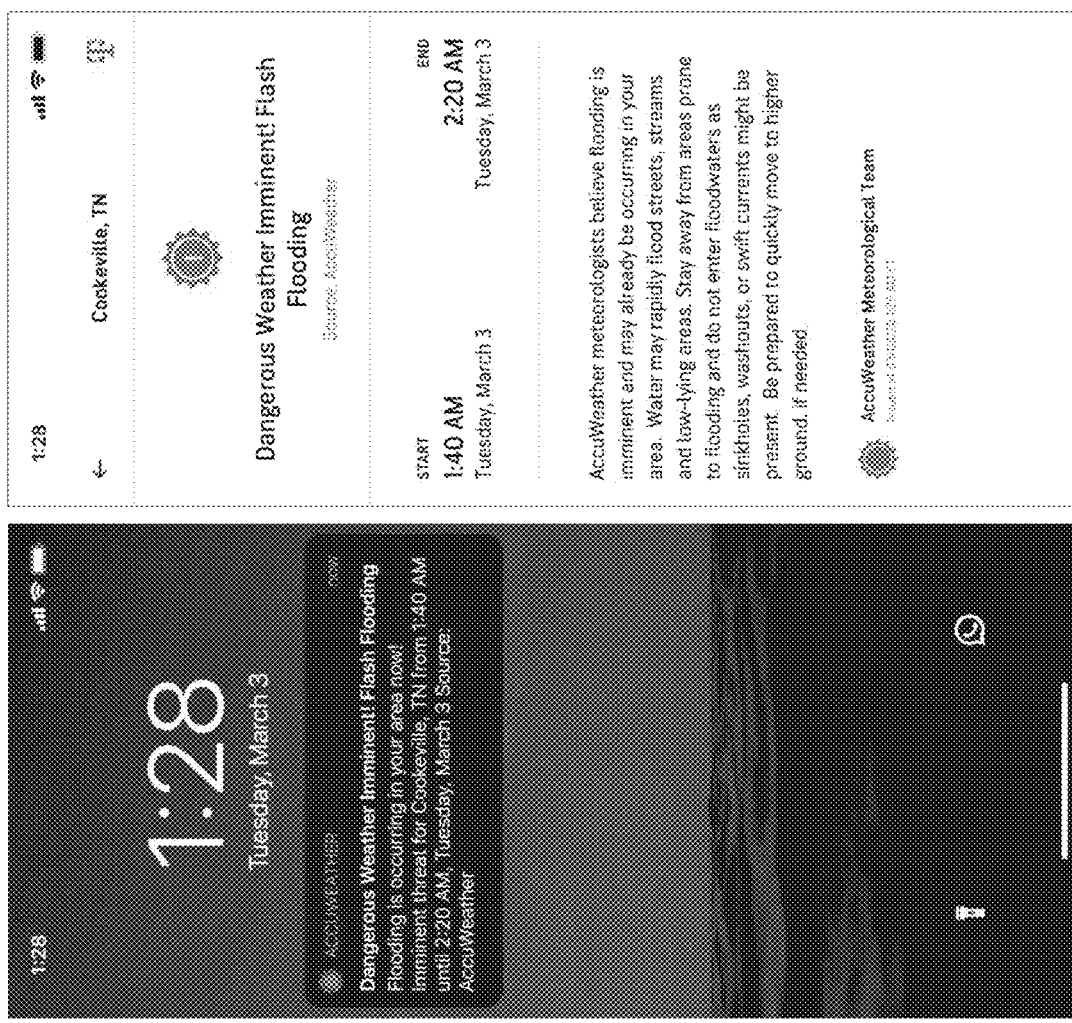
FIG. 25 is a diagram of an example PTI Imminent Alert in accordance with the example implementation of FIG. 1.

Referring now to FIGS. 1-31, an overview of an example implementation 100 is shown and described herein. As shown in FIG. 1, the example implementation 100 comprises a management platform 120. The management platform 120 receives inputs corresponding to raw weather, non-weather, and environmental data from various data sources 140, including local, state, and federal agencies, as well as commercial, educational, and other private-sector sources, raw weather model output data, content, and products from all sources, including local, state, and federal agencies, as well as commercial, educational, and other private-sector sources, forecast data, content, warnings, and products from all sources, including local, state, and federal agencies, as well as commercial, educational, and other private-sector sources to generate output alerts. For example, a user may interact with a user device to cause the management platform to generate and display one or more alerts 190 as best seen in FIGS. 21, 23, and 25.

As further shown in FIG. 1, and by reference number 120, the management platform generates targeted alerts. For example, the management platform may access one or more entity servers 140 (e.g., a server device that stores information associated with weather and non-weather-related data, as described in greater detail below).

As shown in FIG. 1, and by reference number 140, the management platform may receive, from a set of data sources (e.g., data sources 101-114), information that permits the management platform to generate the alert, as described in greater detail below.

The present invention includes an entity server 150 capable or running various processes and algorithms capable of curating and performing normalization processes on the Data Inputs from any of the Data Sources 140. and extracting key data elements through one or more curation and normalization processes, which are depicted in FIG. 1 as part of the Initial Processing Step. These key data elements may then be transformed into a new dataset with a unique and extensible format for use in downstream processes and platforms.

Once the Data Inputs have been processed, they may then be ingested into an entity server 160 capable of running various processes to support operational meteorologists. These "Tap on the Shoulder" processes inform and alert the meteorologists to when a new weather observation, or other content, has been received that may be critical in the forecasting of a certain weather or non-weather event.

In addition, the entity server 160 may also utilize numerous "Rules-based Analyses" that help to identify when conditions are favorable for the formation of certain severe weather and non-weather events. These "Tap on the Shoulder" processes and rules-based analyses may be presented to meteorologists in real-time through one or more display platforms as a visual event flag to be viewed and acknowledged. As such, the "Tap on the Shoulder" processes and the Rules-based Analyses may serve as the precursors for issuing the Alerts 190.

The processed Data Inputs may also be ingested into various Meteorologist Controlled Software Management Platforms 180. These Meteorologist Controlled Software Management Platforms 180 display available information in a graphical format and allow for a situational awareness of the current state of the weather and the environment in a way and to a degree that has never been available before. This allows meteorologists to process the information and forecast events with much greater accuracy and much sooner than other available sources.

The Alerts 190 released to the client, user, and/or public through, for example, a mobile application or, for example, other wireless platforms will inform the client, user, and/or public of severe weather and non-weather events. The Alerts 190 preferably incorporate: common language that is uniform and consistent across each event regardless of the nature of each event, which will allow for easy and complete comprehension of the event by the public; the dynamic parameters of the event to allow for people in the imminent path of the event, or people that will be impacted at some later point in time and location, to be informed and warned appropriately; and the specific actions, instructions, and recommendation to implement to reduce and minimize the loss of life and destruction of property.

Figure 2:
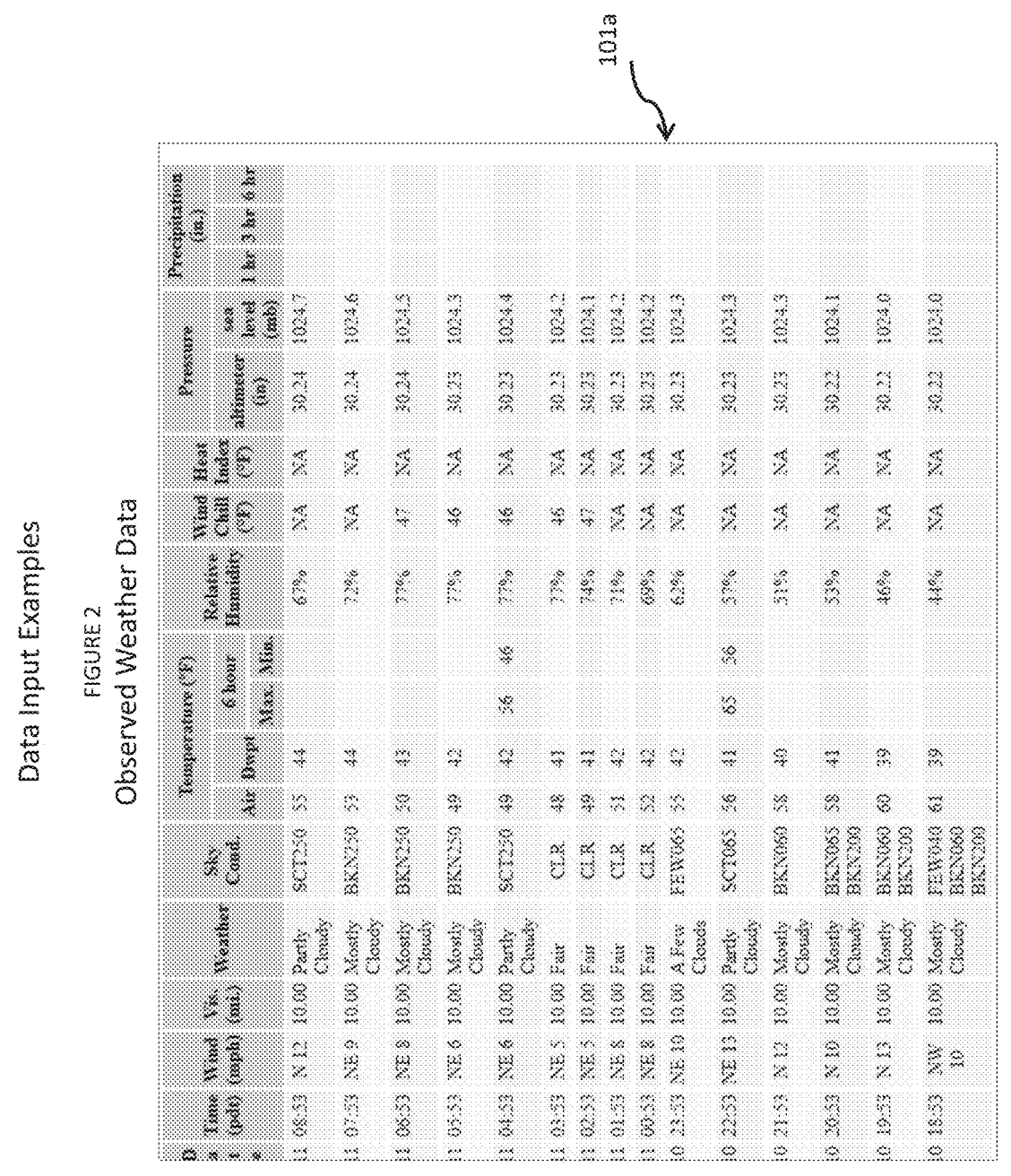
Figure 3:
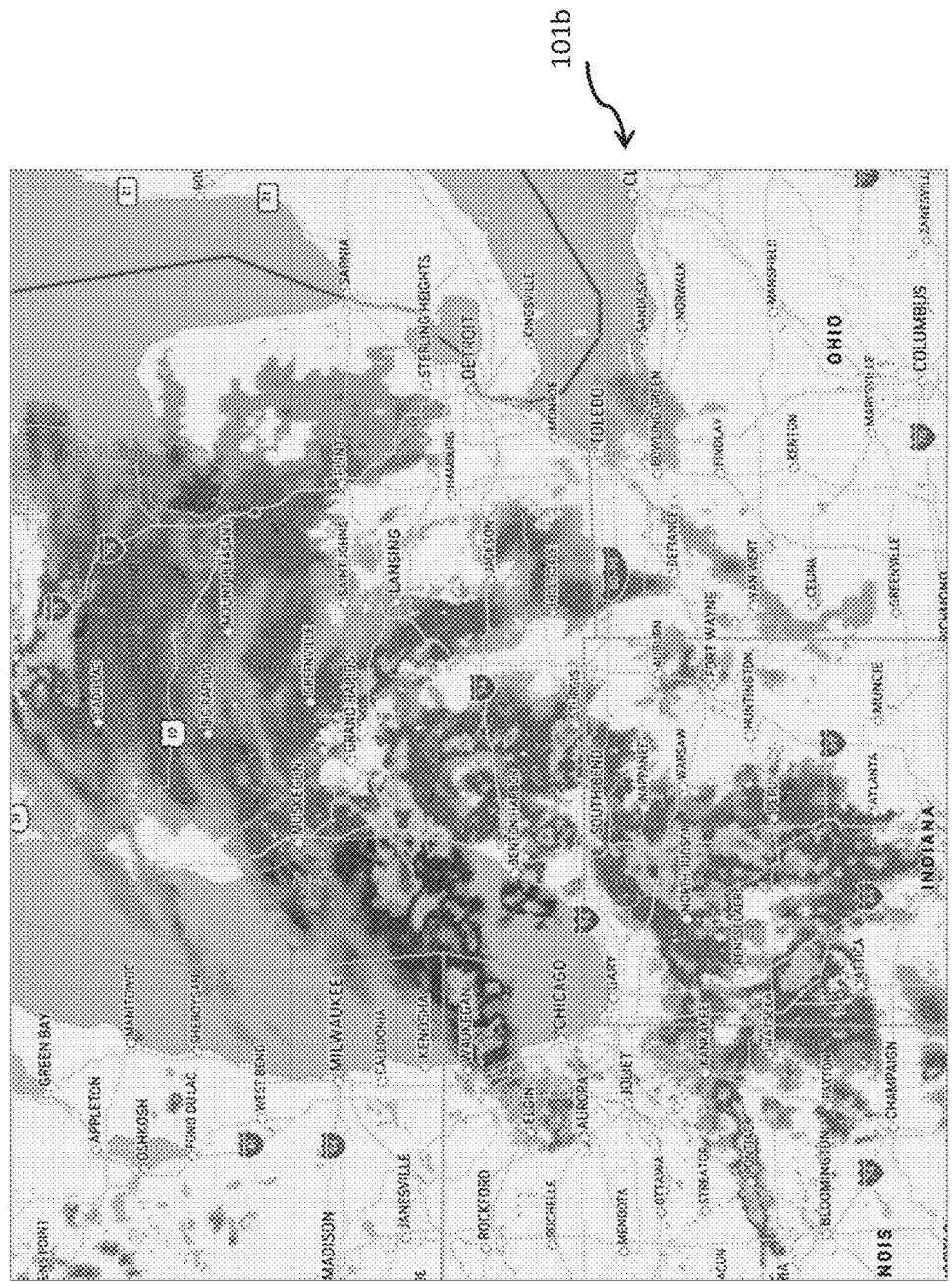
FIG. 3 is a diagram of an example Doppler Radar Data Source in accordance with the example implementation of FIG. 1.
Figure 4:
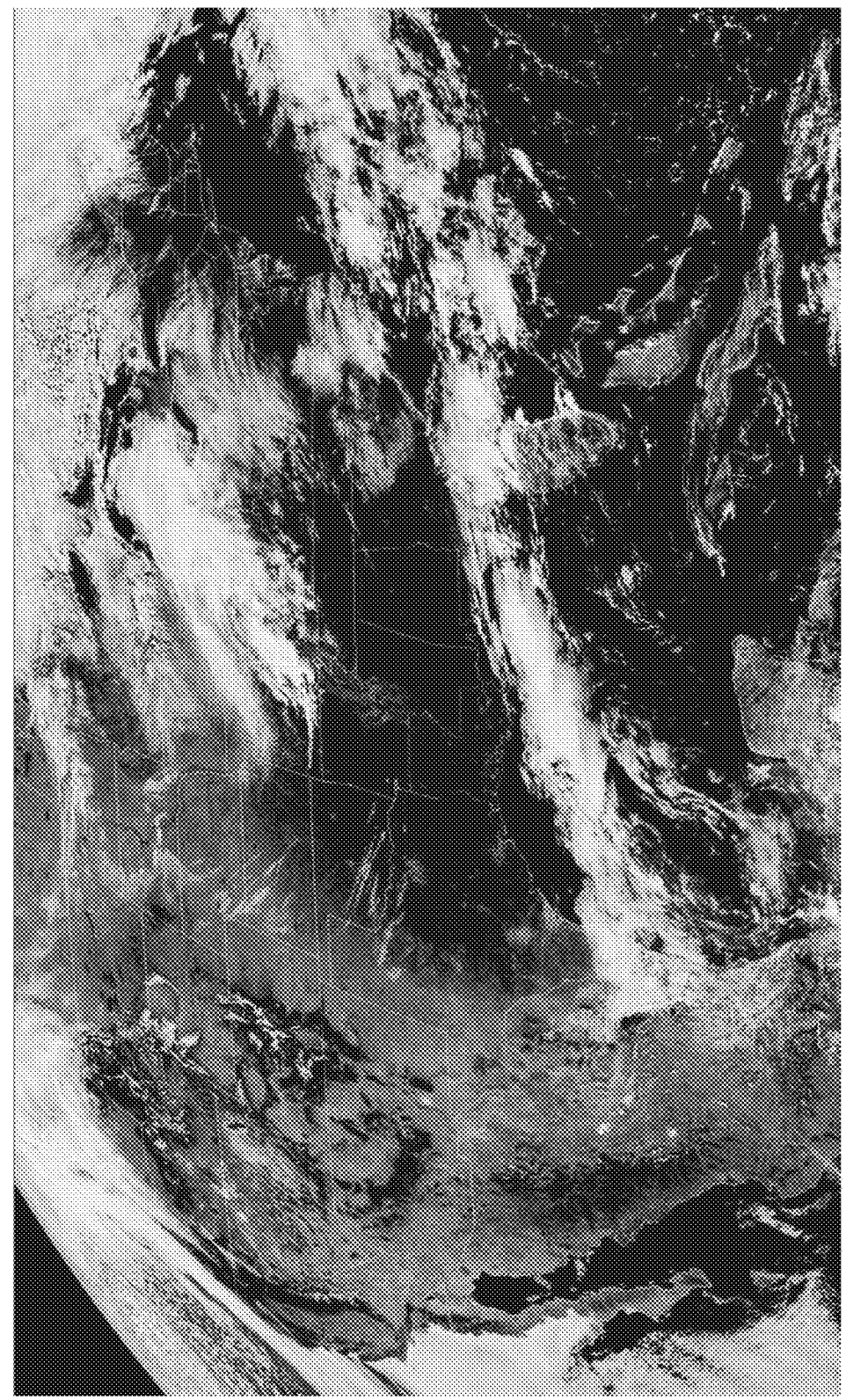
FIG. 4 is a diagram of an example Satellite Imagery Data Source in accordance with the example implementation of FIG. 1.

In some implementations the data sources 140 include Observed Weather Data Sources 101. The Observed Weather Data Source 101 Observed weather data may originate from government-maintained weather stations, state or airport weather stations, private sector weather stations, and the like. An example Observed Weather Data Source 101a is shown in FIG. 2. In this case, the data are from a reporting station in Seattle, Wash., for various hours of May 10 and 11, 2021. Doppler Radar data 101b (precipitation data; an example is shown in FIG. 3) and Satellite imagery 101c (visual and other wavelengths, an example is shown in FIG. 4) are provided by the National Weather Service (NWS). The Radar and Satellite data were captured on May 8, 2021.

Figure 5:
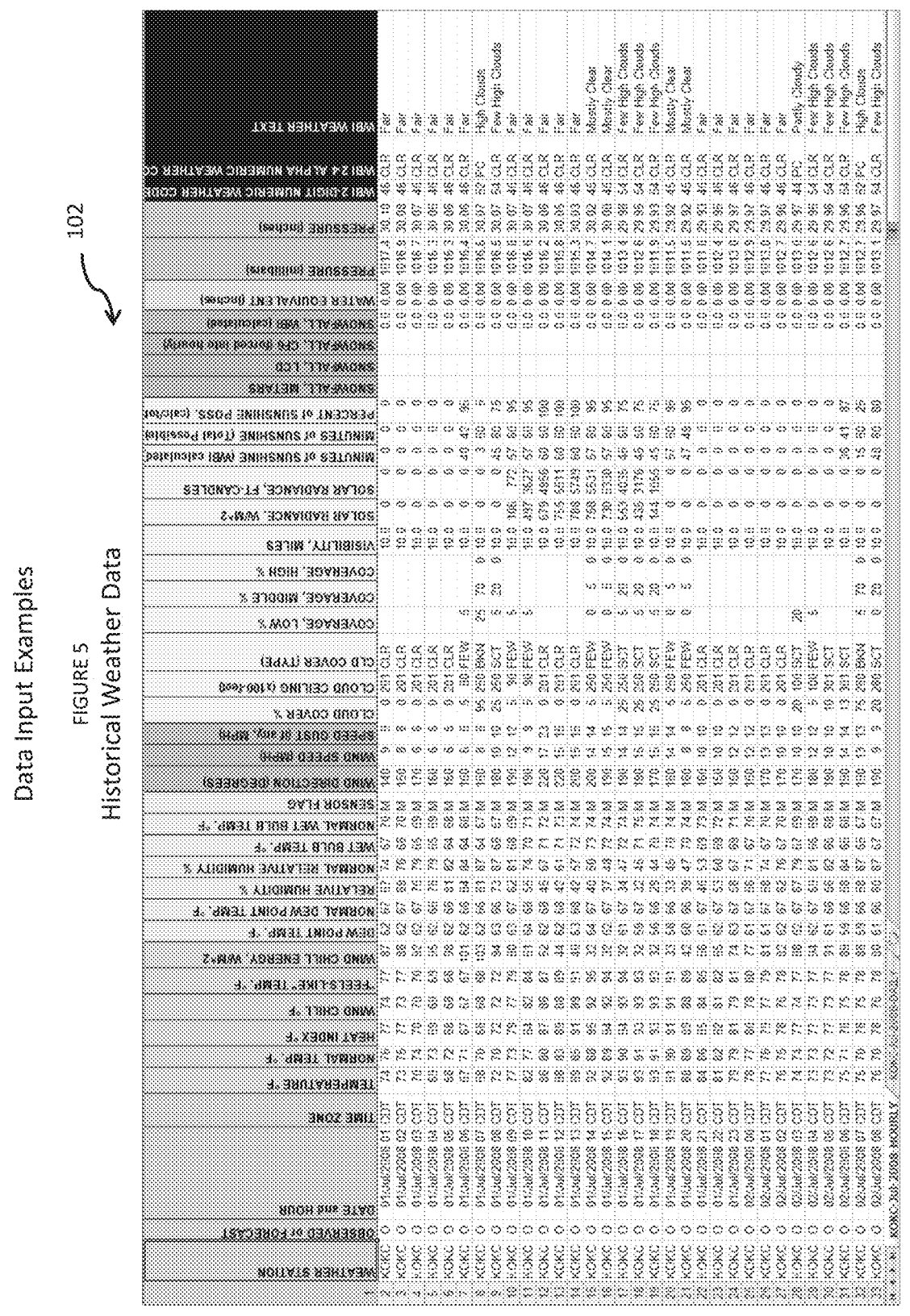

In some implementations the data sources include Historical Weather Data Sources 102. The Historical Weather Data Source 102 may include observed weather data recorded in the past (an example is shown in FIG. 5) from the Observed Weather Data Source 101 or the like. The data are from the reporting station in Oklahoma City, Okla., during July 2008.

Figure 6:
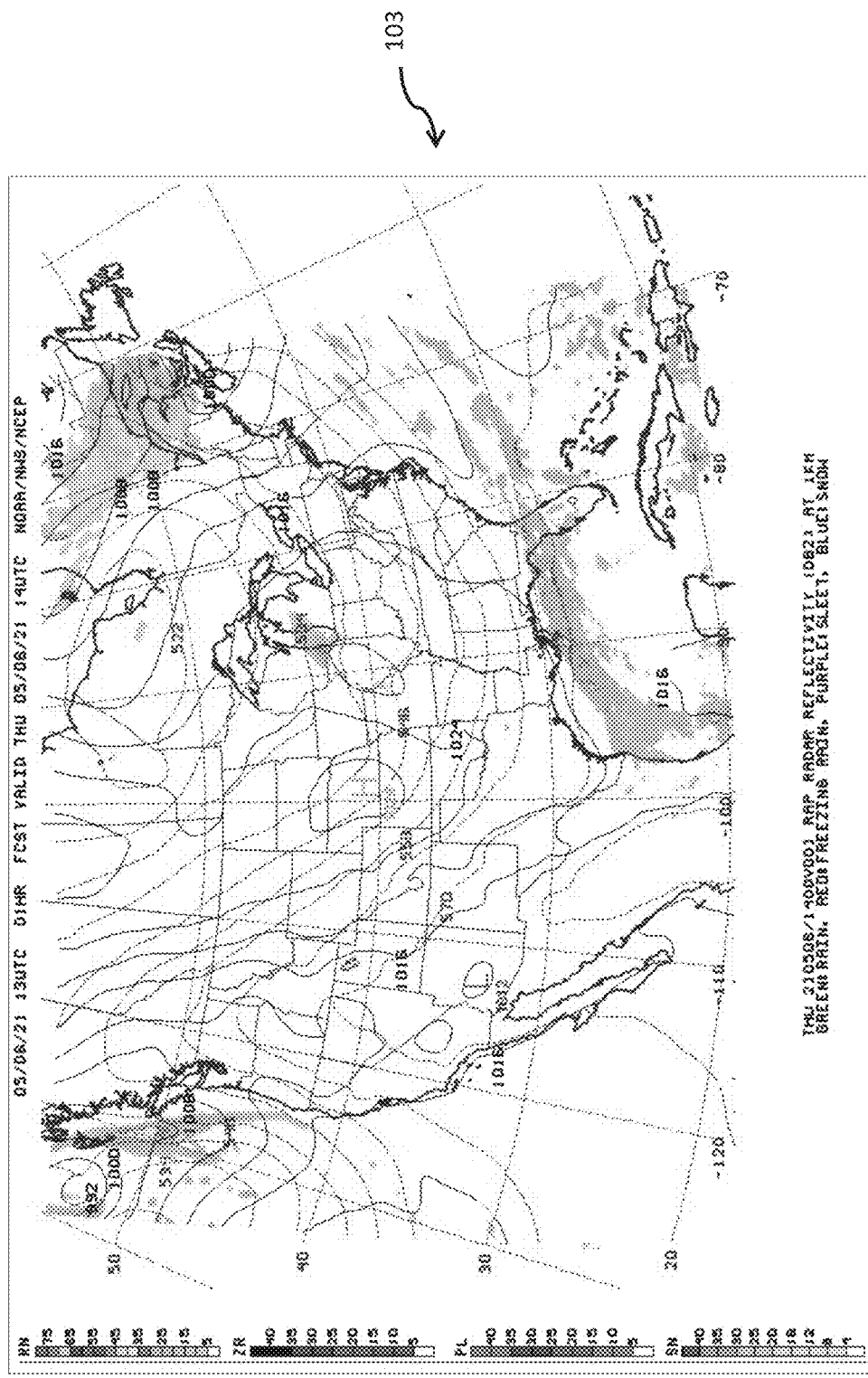
FIG. 6 is a diagram of an example Historical Model Runs Data Source in accordance with the example implementation of FIG. 1.

In some implementations the data sources include Historical Model Runs and Resulting Forecasts 103. The Historical Model Runs and Resulting Forecasts 103 may include weather forecast models that are generated using observed weather data. The resulting forecasts from various model runs are verified at some time in the future. Historical models runs are those runs that were generated at some time in the past and archived (an example is shown in FIG. 6) and are produced by government agencies and other sources.

Figure 7:
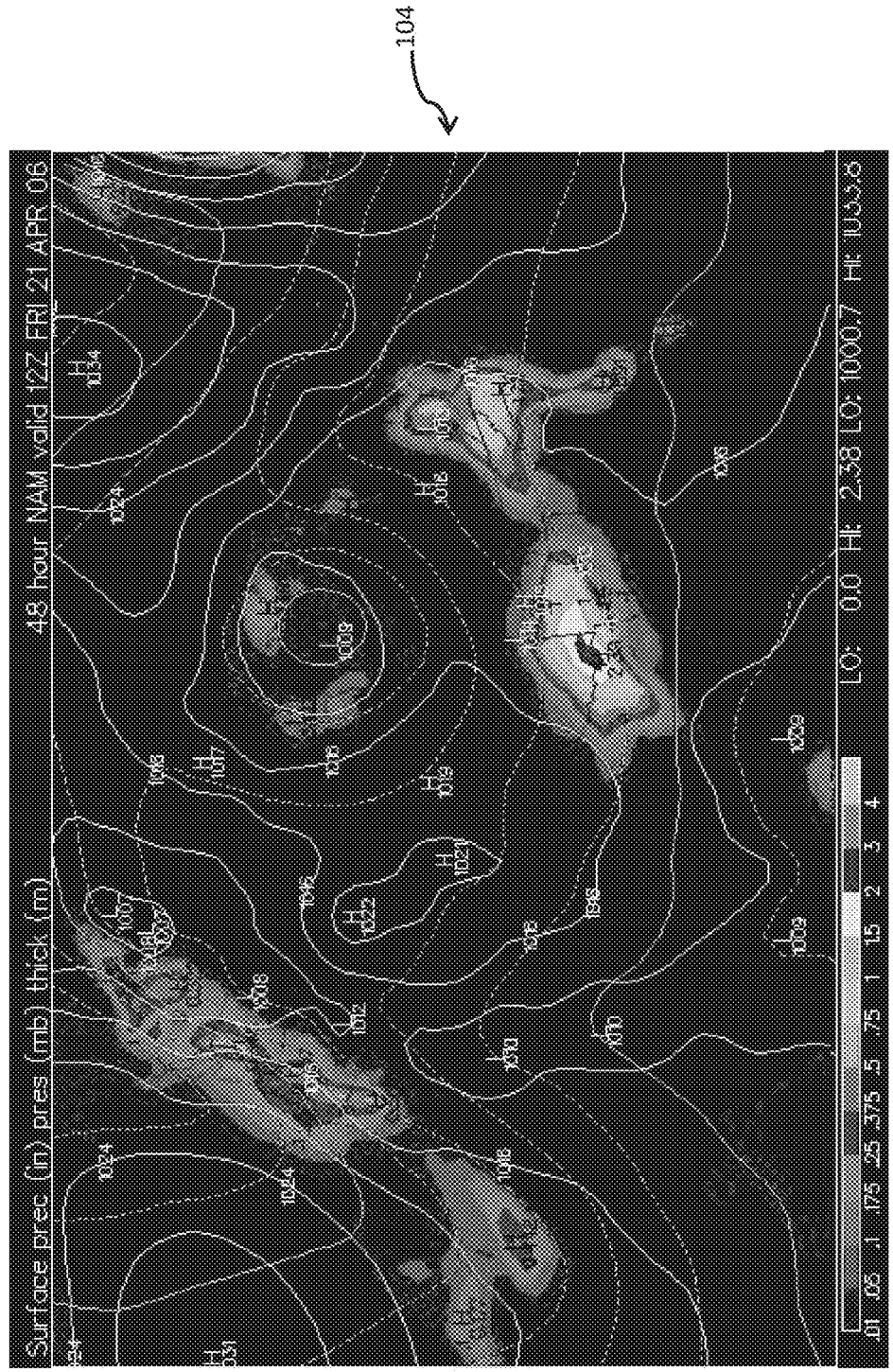
FIG. 7 is a diagram of an example Historical Ensemble Model Runs Data Source in accordance with the example implementation of FIG. 1.

In some implementations the data sources include Historical Ensemble Model Runs and Resulting Forecasts 104. The Historical Ensemble Model Runs 104 and Resulting Forecasts may include the combinations of two or more individual weather models generated at some time in the past using observation data (an example is shown in FIG. 7).

Figure 8:
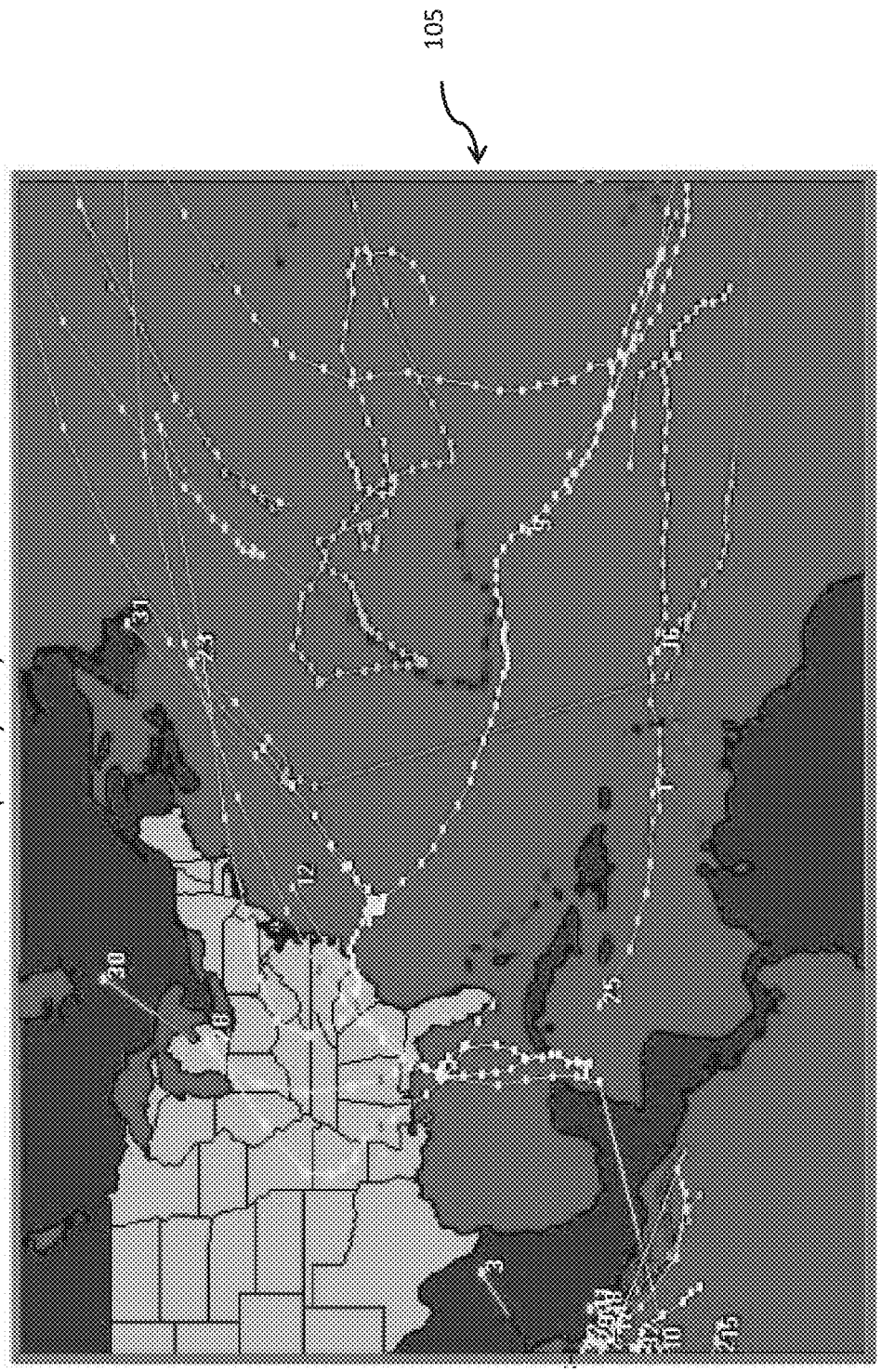
FIG. 8 is a diagram of an example Historical Analog Input Data Source in accordance with the example implementation of FIG. 1.

In some implementations the data sources include Historical Analog Inputs 105. The Historical Analog Inputs 105 may include historical analog inputs are data provided by professional meteorologist based on past observed data and/or past observed events with each input subjectively weighted by the meteorologist to result in a new parameter (an example is shown in FIG. 8). An example is when a meteorologist determines the hurricane activity for the current year based upon weighing the hurricane outcomes from past years and the correlation of the conditions from past years to the current year. The weighing coefficients are determined by the meteorologist. Analog input may come from a variety of sources.

In some implementations the data sources include Historical Global/Regional Re-analyses/Re-Forecast 106. The Historical Global/Regional Re-analyses/Re-Forecast 106 may include an historical global/regional model analysis may be rerun with corrected data and/or other inputs to produce a re-analysis and re-forecast (examples are shown in FIG. 9).

In some implementations the data sources include Patterns Provided By Meteorologists 107. These Patterns 107 are subjective inputs from experienced meteorologists and are normally an intangible input or inputs based on the past experiences of the meteorologists with certain severe weather or non-weather conditions. This subjective analysis allows meteorologists to refine the outputs from certain weather models and forecast routines.

In some implementations the data sources include Third Party Datasets 108. The Third Party Datasets 108 may be acquired from a variety of suitable sources depending on the nature of the data. For example, the U.S. Geological Survey provides data on earthquakes occurring throughout the world and maintains a historical record of all past events. The data may be textural in format or presented graphically, such as in map form (examples are shown in FIG. 10).

In some implementations the data sources include Targeted Output Locations 109. The Targeted Output Locations 109 data source represents the locations of the client or user or their physical assets and are the foundation for the targeted Alerts, described in greater detail below. These data may be formatted as zip codes, points or polygons of latitude/Longitude, and/or data digitized from map displays by Applicants'_employees. The location data can originate with the client and/or user or can be ascertained from publicly available data sources. As an example, zip code data may be acquired from: www.tools.usps.com/zip-code-lookup.htm. This data also contains various criteria or thresholds unique to the location of each client or user, or the location of each client's or user's assets. These data can be associated with a) the time in advance of an identified event; b) the distance proximity of an identified event; and/or c) the threshold breach of a qualifier to an identified event.

The physical locations may be static in nature (such as, the location of a street address, distribution center or office building) or may be dynamically changing (such as, the location of a delivery truck traveling along an interstate highway). The data may be in a variety of formats, including zip codes, points of latitude and longitude, and the like (an example is shown in FIG. 11).

In some implementations the data sources include Timing/Threshold Components 110. The Timing/Threshold Components 110 represent various limits related to the weather and non-weather events required by the client or user in receiving the targeted Alert. The Timing/Threshold Components 110 may be associated with: the time in advance of an identified event; the distance proximity of an identified event; and/or the threshold breach of a qualifier to an identified event. For example, a client or user may require at least one (1) hour of notice ahead of a rain event at its current location. In another example, a client or user may want to be alerted when a lightning event is approaching its asset location and breaches the 25-mile radius to the location. Similarly, a client or user may want to be alerted when the winds within 5 miles of the asset location exceed 25 mph. Several Alert criteria are also shown in FIG. 11.

In some implementations the data sources include Demographic/Social Economic GIS Data Layers 111. The Demographic/Social Economic GIS Data Layers 111 represent other information that aid in the generation and customization of the targeted alerts of the present invention. Examples of such data may include, without limitation, population density, topography, land use, social economic data, and the like and may be obtained from several government sources, private-sector sources, or both. Various examples of demographic and social economic GIS data layers 111 are graphically presented in FIG. 16.

Figure 12:
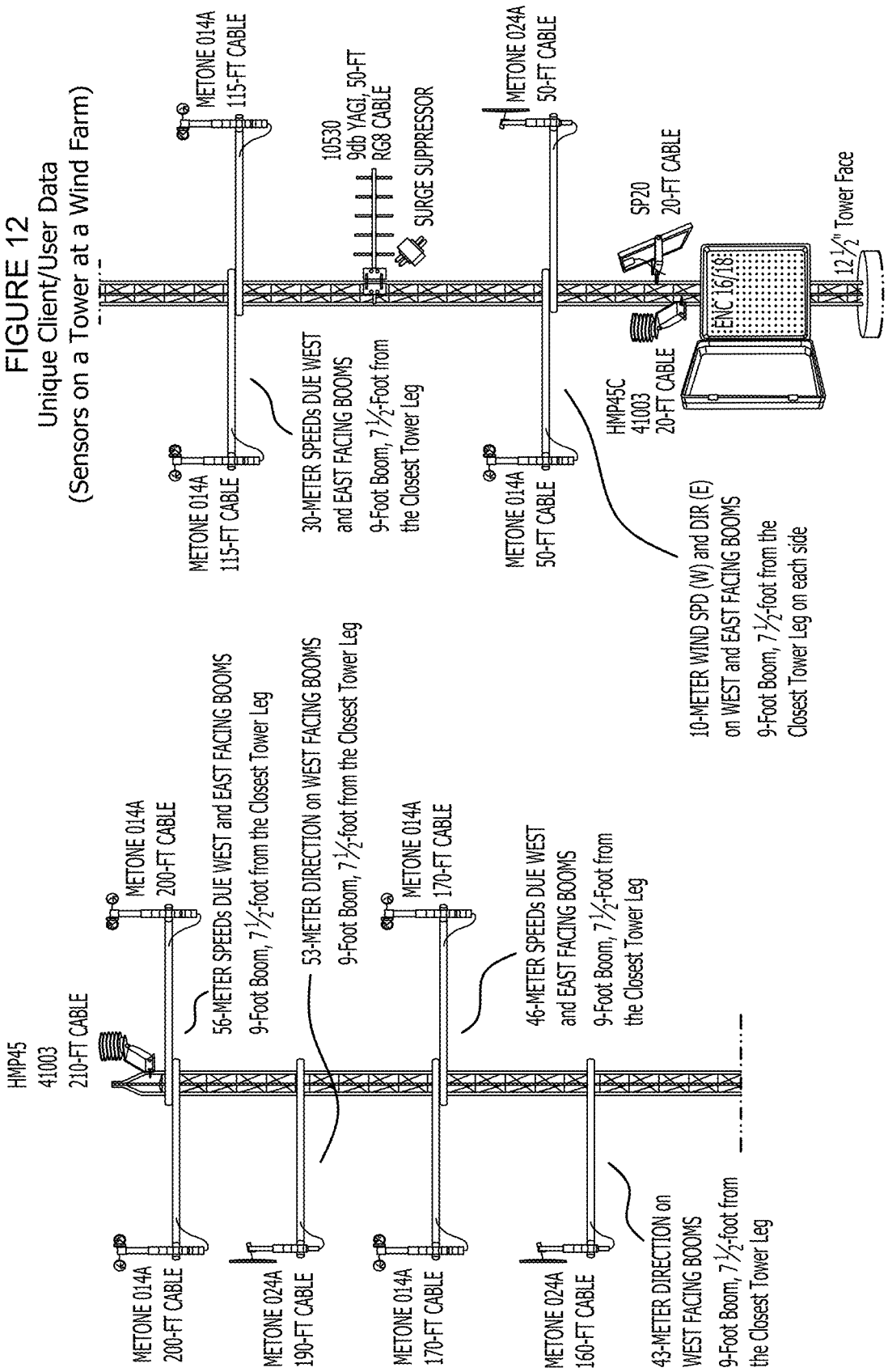
FIG. 12 is a diagram of an example Unique Client/User Data, Data Source in accordance with the example implementation of FIG. 1.

In some implementations the data sources include Unique Client/User Data 112. The Unique Client/User Data Sources 112 may include proprietary and custom information that may be collected and recorded by a client or a user. These data sources may be meteorological in nature, or not, and maintained in any number of formats. One suitable example is onsite meteorological data recorded within a commercial wind farm project from sensors affixed at several heights above the ground on a tower. An illustrative example of a suitable tower with meteorological sensors is shown in FIG. 12.

In some implementations the data sources include Government Provided Warnings 113. The Government Provided Warnings 113 may be weather or non-weather related and may be issued from a government agency at any level (federal, state, county, city, and the like). Routinely, these are warnings from the National Weather Service (an example is shown in FIG. 13).

Figure 14:
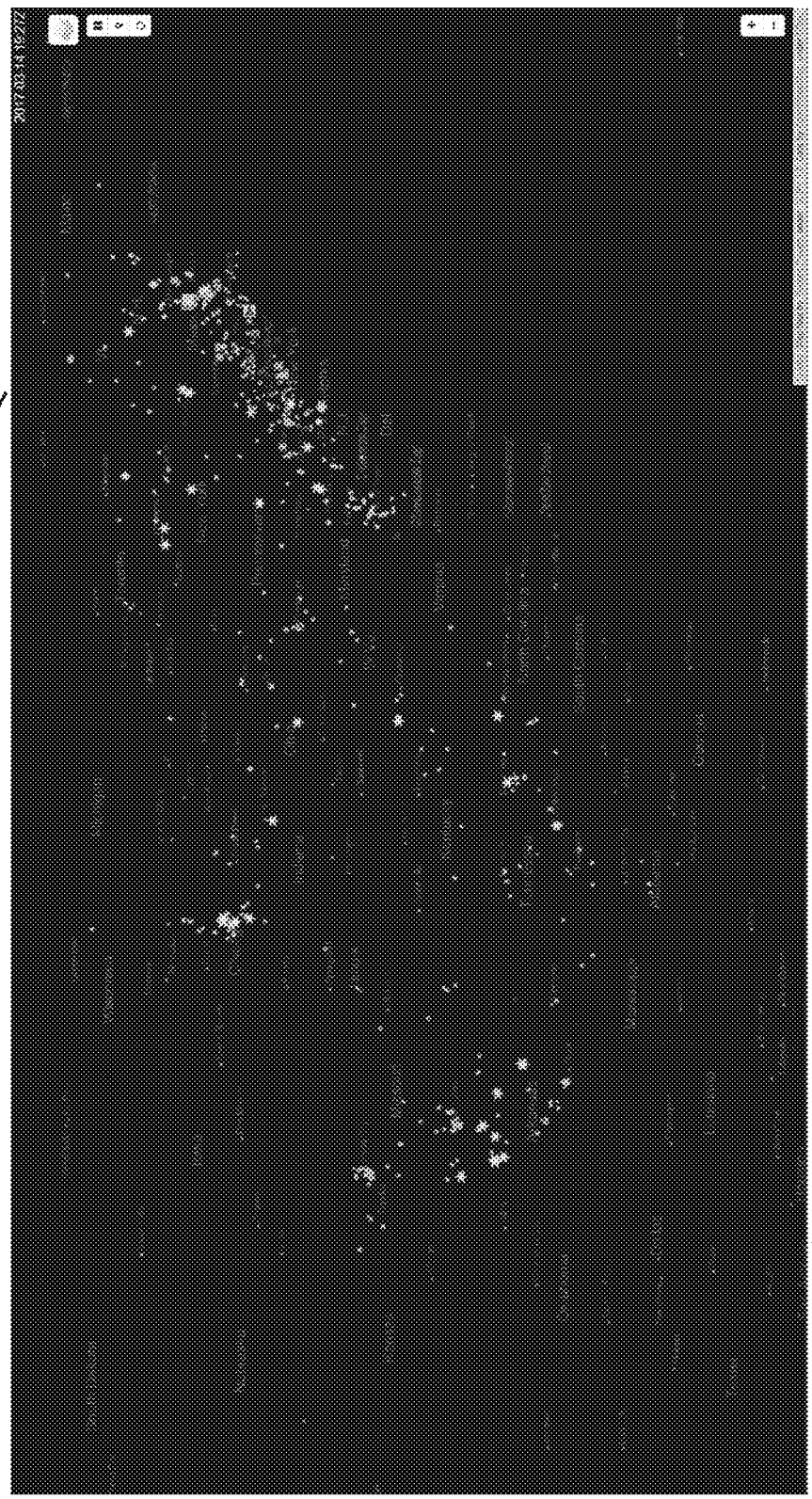
FIG. 14 is a diagram of an example mPING Data Display Data Source in accordance with the example implementation of FIG. 1.

In some implementations the data sources include Other Data Sources 114. The Other Data Sources 114 include any suitable source and may be related to weather and non-weather events, observations, forecasts, and the like. Examples include crowd-sourced weather observations (mPING), traffic information (roadside cameras), Local Storm Reports (LSR) from the National Weather Service, and many others. The mPING data are sourced from mobile users interacting with the mPING Mobile App. The App was developed at the University of Oklahoma (Norman, Okla.) with government support. An example of the mPING data plotted on a map of the U.S. is shown in FIG. 14.

Figure 15:
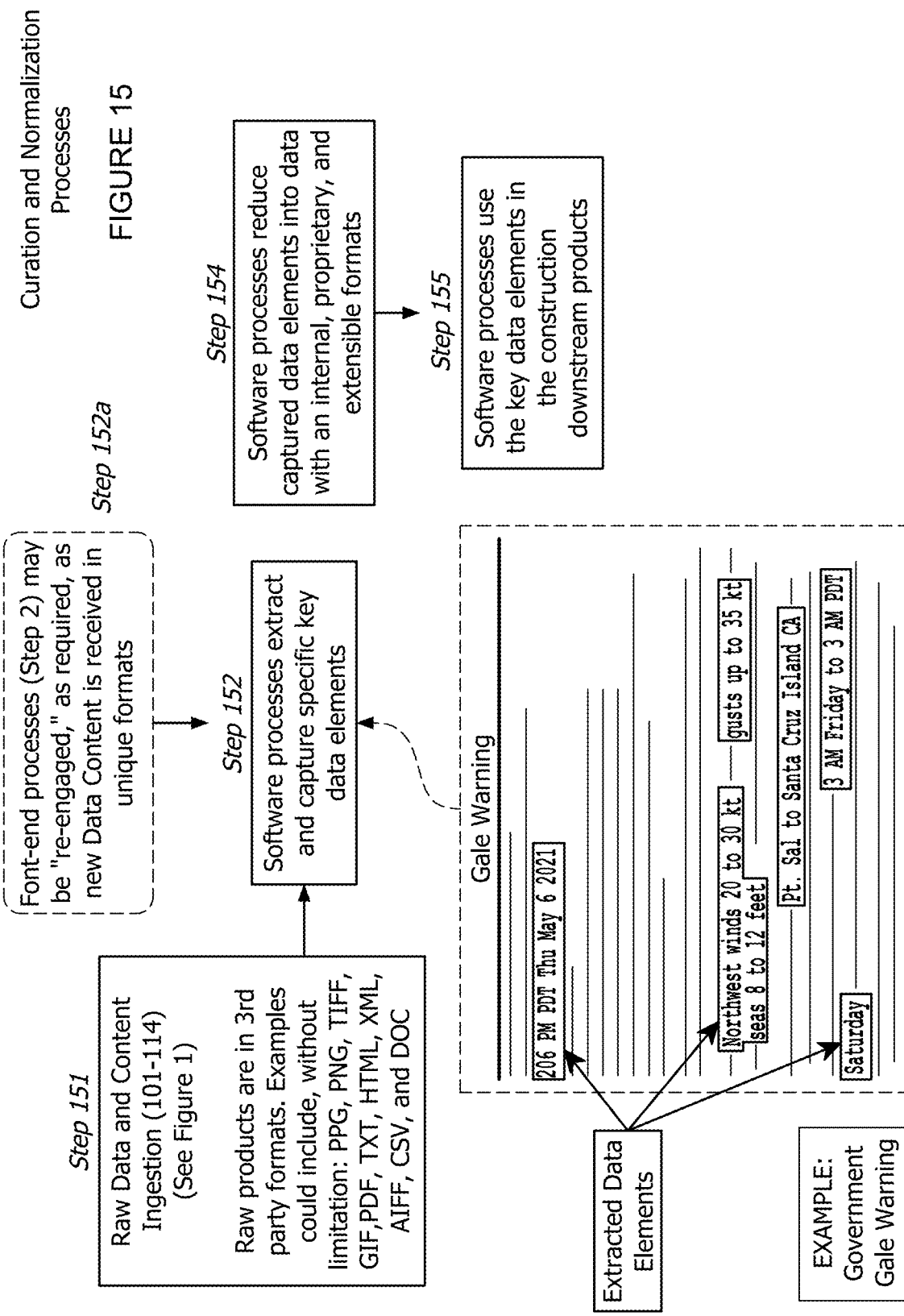
FIG. 15 is a diagram of an example Curation and Normalization Processes in accordance with the example implementation of FIG. 1.

Referring now to FIGS. 1 and 15, the example implementation 100 concatenates the location of the clients or users, or assets of the clients or users, and determines when a weather or non-weather event crosses a time or geographical boundary or geo-fenced area to notify the client or user with an Alert. In some cases, the client or user may rely on meteorologists or the like to create and establish the appropriate warning threshold or boundary for the weather or non-weather event, based on their level of experience. Examples would include when to provide warnings for events associated with lightning, tornadoes, and flooding.

In Step 151, the example implementation 100 includes an entity server 150 which runs various processes and algorithms capable of ingesting and breaking down the Data Inputs from any of the Data Sources 140, regardless of their original format (e.g., text, DOC, PNG, JPG, GIF, PDF). In step 152 the processes extract key data elements through one or more curation and normalization processes, which are depicted in FIG. 1 as Initial Processing. In step 154, these key data elements are preferably transformed into a new dataset with a unique and extensible format for use in downstream processes and platforms. In step 155, the downstream processes use the key data elements in the construction of downstream products as described in greater detail below.

It should be that noted that in step 152*a* the front processes of step 152 may be re-engaged as needed as new data and content are received in unique formats.

Once the Data Inputs have been processed, they are ingested into an entity server 160 capable of running various processes to support operational meteorologists. These processes inform and alert meteorologists to when a new weather observation, or other content, has been received that may be critical in the forecasting of a certain weather or non-weather event. This scenario is defined as a "Tap on the Shoulder" process as shown in FIGS. 16 and 17. The present invention utilizes numerous "Rules-based Analyses" that help to identify when conditions are favorable for the formation of certain severe weather and non- weather events as shown in FIGS. 16 and 18. These Tap on the Shoulder and Rules-based Analyses are presented to meteorologists in real-time through several display platforms as a visual event flag to be viewed and acknowledged. As such, the Tap on the Shoulder process and the Rules-based Analyses may serve as the precursors for issuing any one of the three PTI Alerts, (described in greater detail below in connection with FIGS. 16-18.

In step 161 the processed Data Inputs are ingested into the management platform 120. In step 162, the management platform 120 provides a real-time display in a graphical format and allows for a situational awareness of the current state of the weather and the environment in a way and to a degree that has never been available before. The management platform 120 provides analyses of meteorological data and the layering of one or more data elements at various scales. This allows meteorologists to process the information and forecast events with much greater accuracy and much sooner than all other available sources, as described below.

In step 163, a comparative or "look-up" analyses are completed within the management platform 120 that ascertains whether the risk or threat areas or points are coincident with client or user locations and their thresholds. In step 163, geospatial data are compared against stored locations of the clients and/or users, and/or the locations of their assets for breached thresholds and/or criterion.

With the advantage of having all available and pertinent information available in a variety of formats, in step 164 the management platform 120 then allows the meteorologists or automated routines to construct areas of threat and/or risk as areas, polygons, or points displayed on a map. This process may be completed manually by allowing meteorologists to "outline" or "draw" the appropriate geographical threat or risk area on an interactive map that ingests the constructed area into the management platform 120. The process may also default to allowing automated routines to construct the risk areas.

In this way, the management platform 120 takes the digitized area, polygon, or point and compares this information to stored locations of the clients and/or users, and/or the locations of their assets as shown in FIGS. 16-18. If such is the case, a customized PTI alert can be generated as described below.

Figure 19:
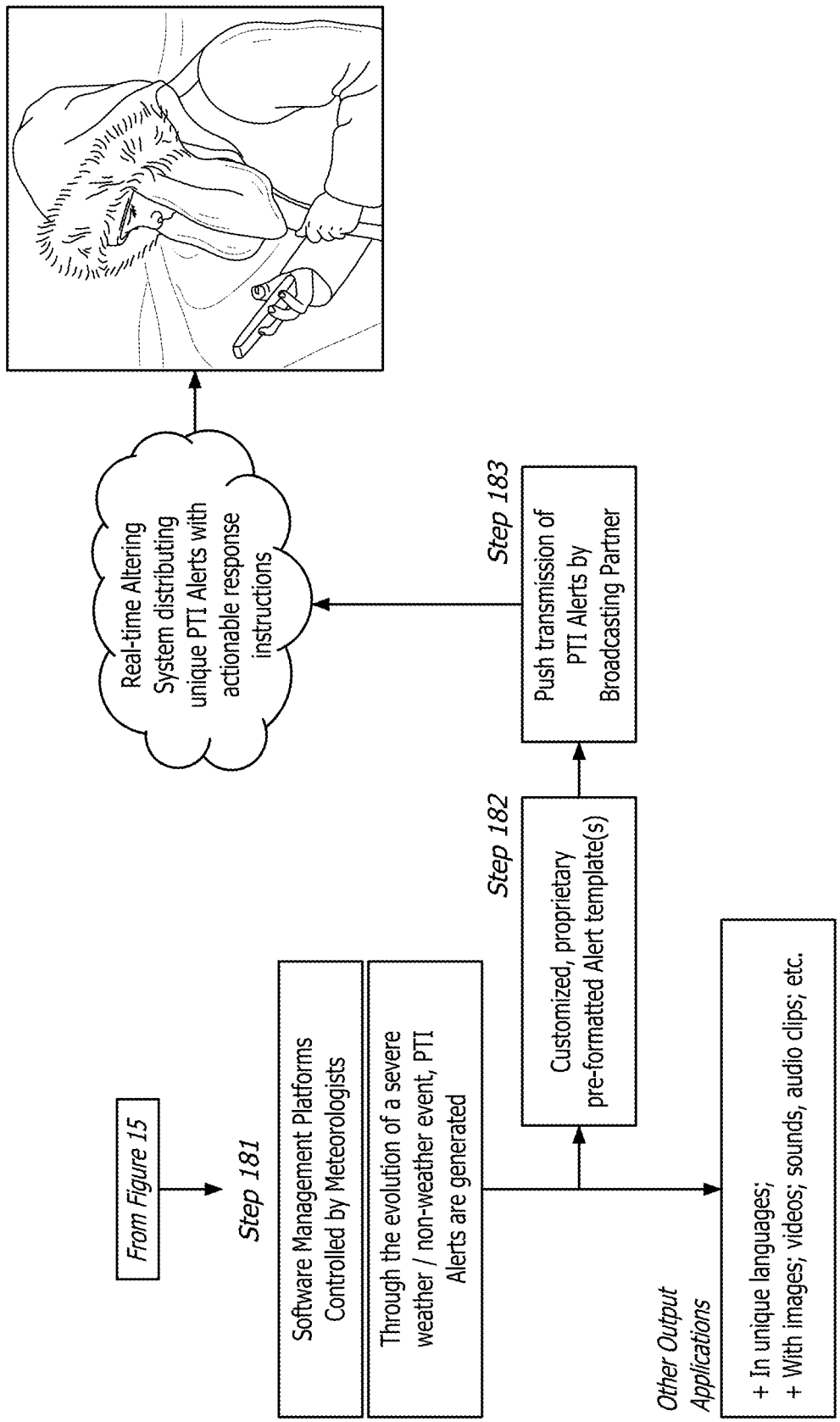
FIG. 19 is a diagram of example PTI Alerts Generation in accordance with the example implementation of FIG. 1.

Referring now to FIG. 19, the Meteorologist Controlled Software Management Platforms 180 is shown. In step 181, ifthe PTI Alerts are generated through the evolution of asevere weather and non-weather events. As shown in FIG. 20, a customized PTI alert is generated using pre-defined templates in step 182 and transmitted automatically either via email or via push notification by a broadcasting partner in step 183 as described below. FIG. 15 is a diagram of an example Curation and Normalization Processes in accordance with the example implementation of FIG. 1;

The Alerts released to the public through the user device utilizing a mobile app, or other wireless platforms, informs the public of severe weather and non-weather events. The Alerts are released when certain conditions or thresholds are met and/or exceeded related to severe weather and non-weather events. Several examples would include, without limitation: Severe Weather Events: Winds greater than 50 mph; Wind gust greater than 65 mph; Snowfall rates greater than 2 inches per hour; Rainfall rates greater than 4 inches per hour; Lightning within 10 miles of an identified location; Heat indices greater than 110° F.; and Wind chill indices less than 0° F.

Severe Non-Weather Events include air quality below the "Acceptable" level (as defined by U.S. Environmental Protection Agency), based on particulate matter amount and size, component content (smoke, pollen, ozone, CO, $CO_2$, $NO_2$, $SO_2$); Seismic activity (earthquakes of a certain magnitude or count per unit of time); Volcanic activity; High UV (or radiation) levels; Wildfires; and the like.

The Alerts preferably incorporate common language that is uniform and consistent across each event regardless of the nature of each event, which will allow for easy and complete comprehension of the event by the public; the dynamic parameters of the event so to allow for people in the imminent path of the event, or people that will be impacted at some later point in time and location, to be informed and warned appropriately; and the specific actions, instructions, and recommendations to implement to reduce and minimize the loss of life and destruction of property.

These actions and instructions have been created through decades of forecasting severe weather and non-weather events. By reviewing historical events, the appropriate actions and recommendations to save lives and mitigate property damage have been developed and stored in an appropriate database. As future events are forecasted and PTI Alerts are generated, this information is retrieved and concatenated appropriately into the PTI Alert.

The alerts 190 are structured in time for the impacted location, as follows:

a. The "Potential" Alert: issued 1-3 days in advance in areas of the Potential event. The Potential Alert is created when either conditions are right for such an event to develop or one or more of several conditions required have already developed. A schematic on how a Potential Alert may evolve is shown in FIG. 20. An actual example of a Potential Alert is shown in FIG. 21.

b. The "Threat" Alert: issued 3 hours to 36 hours before the event and areas of the Threat with the highest risk together with projected time compartments. Then, updated throughout the time window with adjusted time and location compartments. The Threat Alert is created when conditions have developed. A schematic on how a Threat Alert may evolve is shown in FIG. 22. An actual example of a Threat Alert is shown in FIG. 23.

c. The "Imminent" Alert: issued minutes and up to an hour ahead of the event (and during the event) with specific time and location compartments. The Imminent Alert is created and released when the forecasted event has occurred, is about to occur. Additional updates to the Imminent Alert will be released as the event unfolds through time. A schematic on how an Imminent Alert may evolve is shown in FIG. 24. An actual example of an Imminent Alert is shown in FIG. 25.

Figure 26:
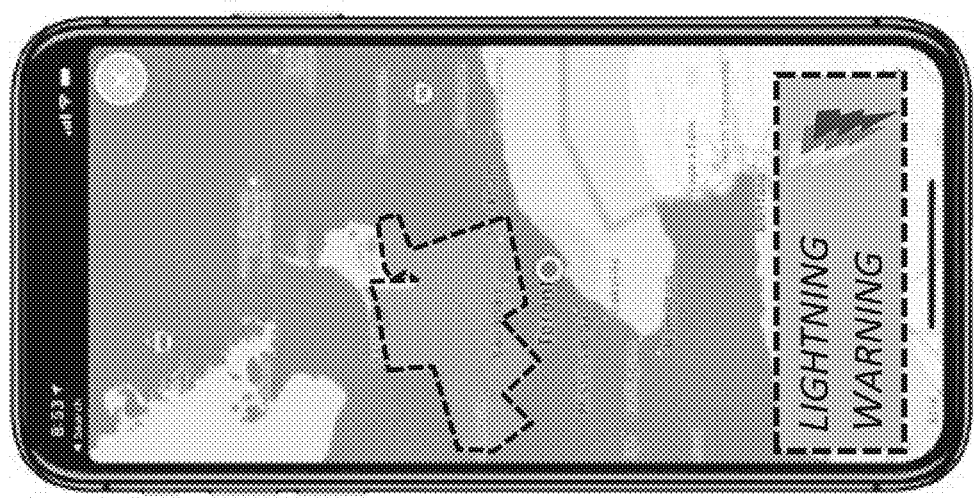
FIG. 26 is another PTI Alert Example in accordance with the example implementation of FIG. 1.
Figure 27:
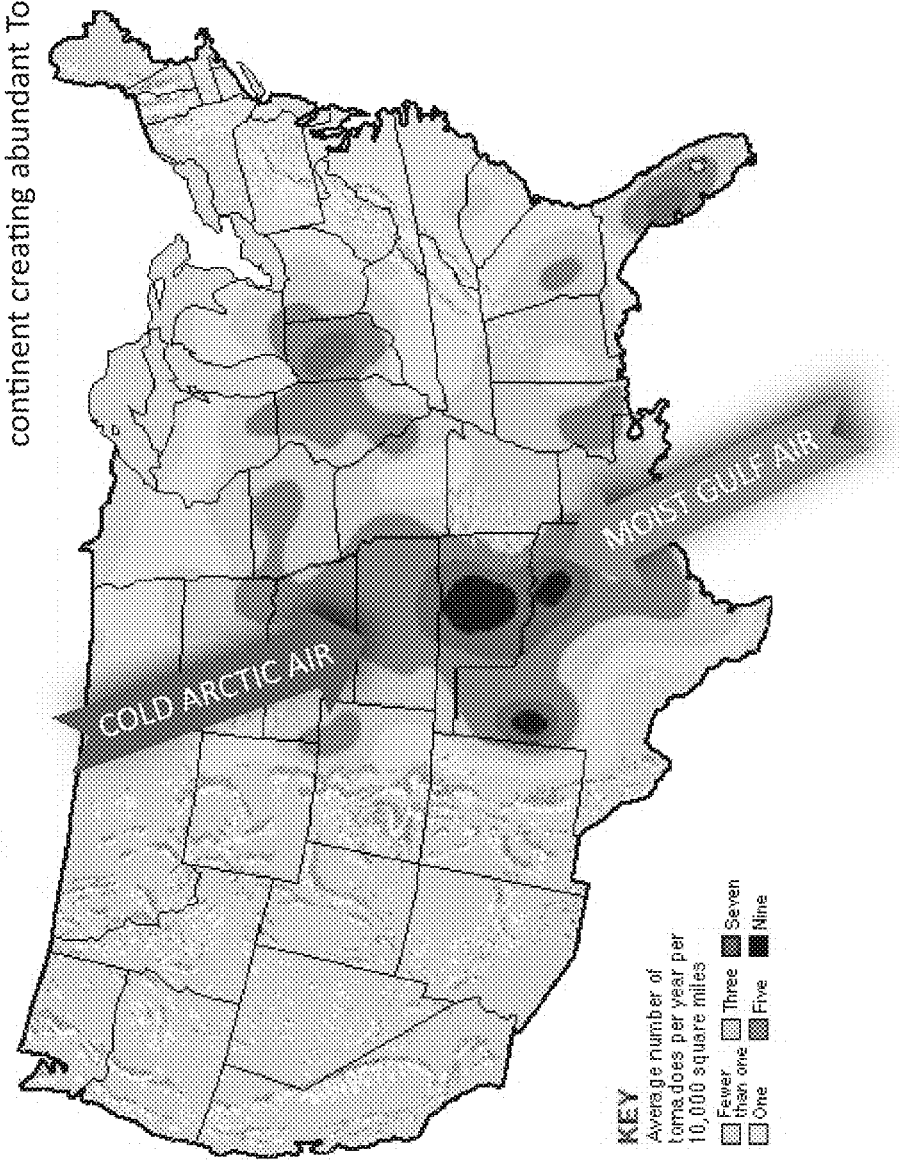
FIG. 27 is a third PTI Alert Example in accordance with the example implementation of FIG. 1.
Figure 28:
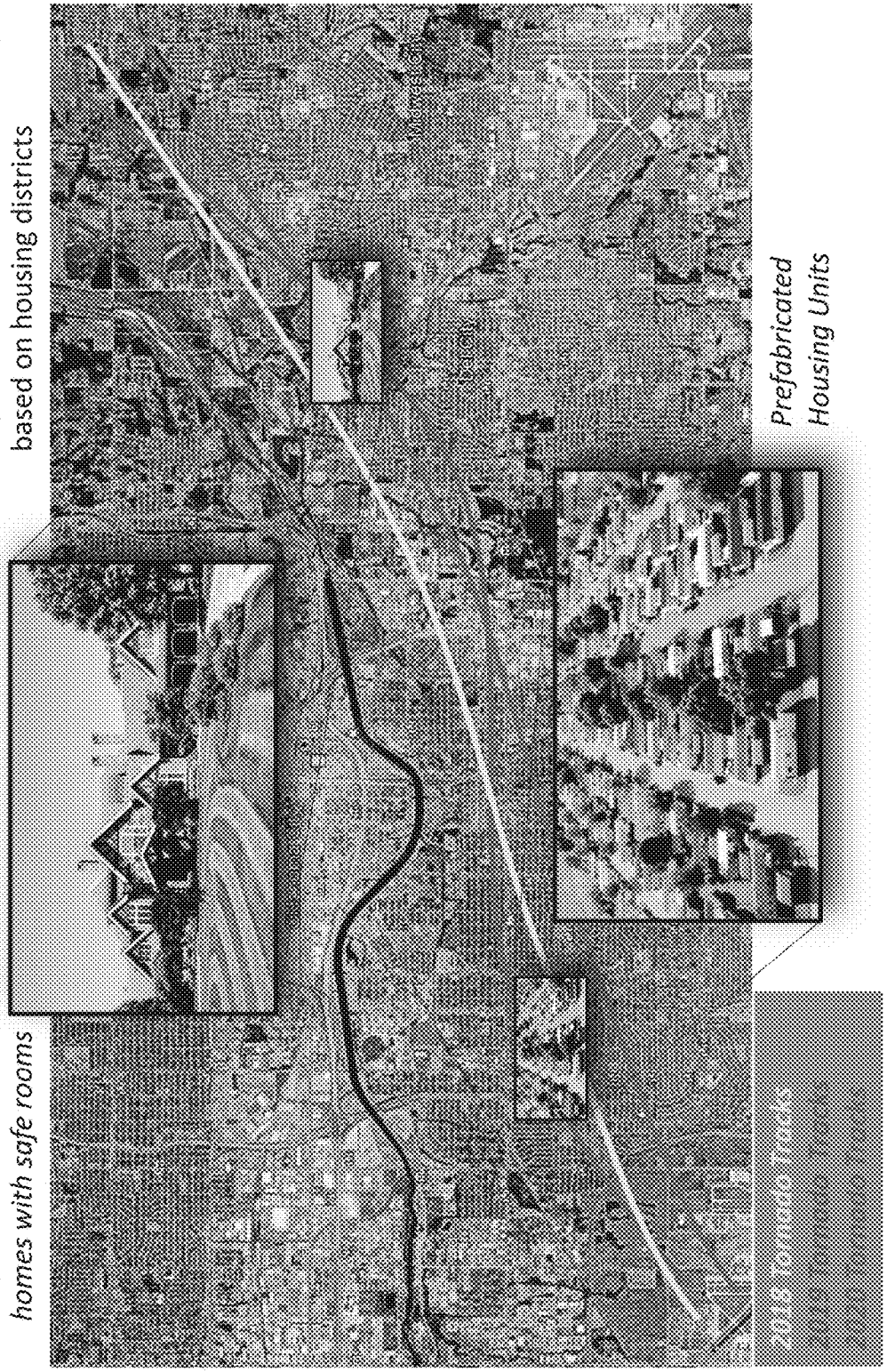
FIG. 28 is a fourth PTI Alert Example in accordance with the example implementation of FIG. 1.
Figure 29:
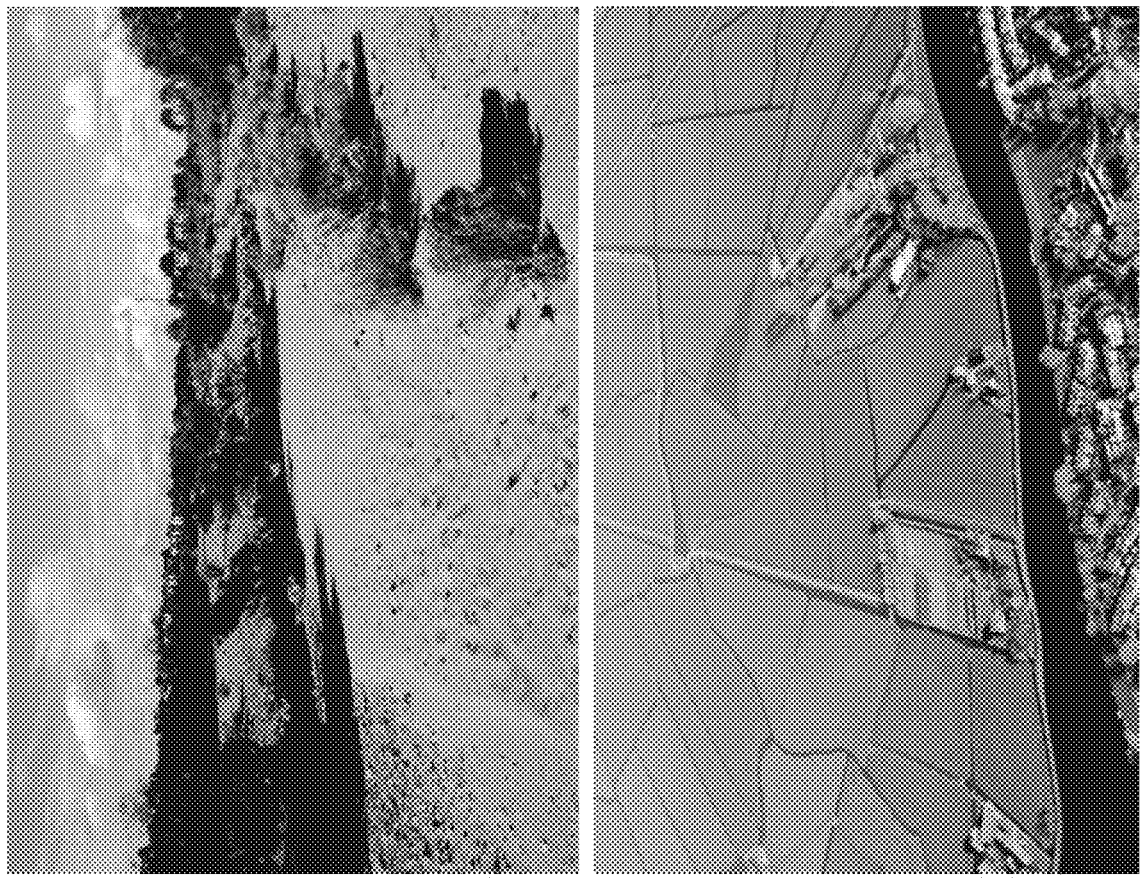
FIG. 29 is a fifth PTI Alert Example in accordance with the example implementation of FIG. 1.

The output of the Alerts may include, without limitation, information in a textual format, as well as images, graphics, maps, animations, icons, emojis, videos, etc., to help covey the message of the Alert (FIG. 26). FIGS. 27-29 provide further examples of representative alerts.

Furthermore, the Alerts could contain distinctive sounds and/or tones, to help identify and convey the messages to the public. The alert may comprise an SMS post, dashboard display, recorded audio and/or video clip, or other output format, and could be transmitted via a suitable means, such as a mobile device, vehicle display system, personal computer, and/or into a corporate or government information system or the like typically used to disseminate information to multiple people and/or locations.

As the Alerts become well known, accepted, and utilized by the public, it is contemplated and within the scope of the present invention, that the platform for generating and sending alerts is expanded to include scenarios and conditions of other events, such as and including, without limitation, areas affected by social unrest (riots, military activity, and the like), man-made disasters (industrial accidents, toxic chemical spells and releases, train derailment, traffic pile-ups, and the like), public health conditions (disease epidemics and pandemics, ground water contamination), and social impacts (Amber and Silver alerts).

As indicated above, FIGS. 1-29 are provided merely as an example. Other examples are possible and may differ from what was described with regard to FIGS. 1-29.

Figure 30:
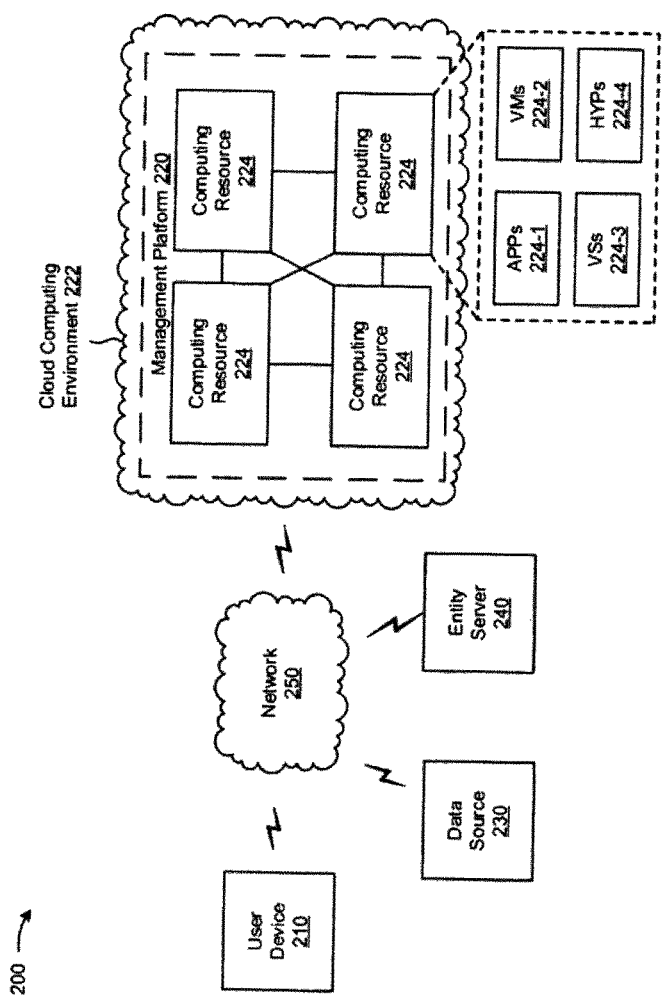
FIG. 30 is a diagram of an example environment in which systems and/or methods, described herein, may be implemented.

FIG. 30 is a diagram of an example environment 200 in which systems and/or methods, described herein, may be implemented. As shown in FIG. 30, environment 200 may include a user device 210, a management platform 220, a data source 230, an entity server 240, and a network 250. Devices of environment 200 may interconnect via wired connections, wireless connections, or a combination of wired and wireless connections.

User device 210 includes one or more devices capable of receiving, generating, storing, processing, and/or providing information associated with management platform 220. For example, user device 210 may include a computing device, such as a desktop computer, a laptop computer, a tablet computer, a handheld computer, a server device, a mobile phone (e.g., a smart phone or a radiotelephone), a wearable communication device (e.g., a smart wristwatch, an activity band, or a pair of smart eyeglasses), a gaming device, or a similar type of device.

Management platform 220 includes one or more devices capable of receiving information associated with an input corresponding to a search for an item, identifying a set of items based on the input, and providing information associated with a subset of items based on trend scores and sentiment scores associated with the subset of items, as described elsewhere herein. In some implementations, management platform 220 may be designed to be modular such that certain software components can be swapped in or out depending on a particular need. As such, management platform 220 may be easily and/or quickly reconfigured for different uses.

In some implementations, as shown in FIG. 30, management platform 220 may be hosted in a cloud computing environment 222. Notably, while implementations described herein describe management platform 220 as being hosted in cloud computing environment 222, in some implementations, management platform 220 may not be cloud-based (i.e., may be implemented outside of a cloud computing environment) or may be partially cloud-based.

Cloud computing environment 222 includes an environment that hosts management platform 220. Cloud computing environment 222 may provide computation, software, data access, storage, and services that do not require end-user (e.g., user device 210) knowledge of a physical location and configuration of system(s) and/or device(s) that hosts management platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host management platform 220. Cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 30, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with management platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Data source 230 includes one or more devices, accessible through network 250, that are sources of information that may be used by management platform 220. For example, data source 230 may include a server that includes particular information for use by management platform 220 and/or user device 210. For example, data source 230 may include a server or a group of servers (e.g., a cloud-based server, an application device, a content server, a host server, a web server, a database server, etc.), a desktop computer, or a similar device. In some implementations, various data sources 230 may provide information associated with social media posts, sales figures, weblog posts, articles, search engine analytics metrics, or the like.

Entity server 240 includes one or more devices, accessible through network 250, that are sources of information that may be used by management platform 220. For example, entity server 240 may include a server that includes particular information for use by management platform 220 and/or user device 210. For example, entity server 240 may include a server or a group of servers (e.g., a cloud-based server, an application device, a content server, a host server, a web server, a database server, etc.), a desktop computer, or a similar device. In some implementations, entity server 240 may provide information associated with an entity, such as information associated with a current inventory of items, sales figures, item returns, user profiles, purchase histories, browsing histories, and/or the like.

Network 250 includes one or more wired and/or wireless networks. For example, network 250 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 30 are provided as an example. In practice, there may be additional devices and/or networks, fewer devices and/or networks, different devices and/or networks, or differently arranged devices and/or networks than those shown in FIG. 30. Furthermore, two or more devices shown in FIG. 30 may be implemented within a single device, or a single device shown in FIG. 30 may be implemented as multiple, distributed devices. Additionally, or alternatively, a set of devices (e.g., one or more devices) of environment 200 may perform one or more functions described as being performed by another set of devices of environment 200.

Figure 31:
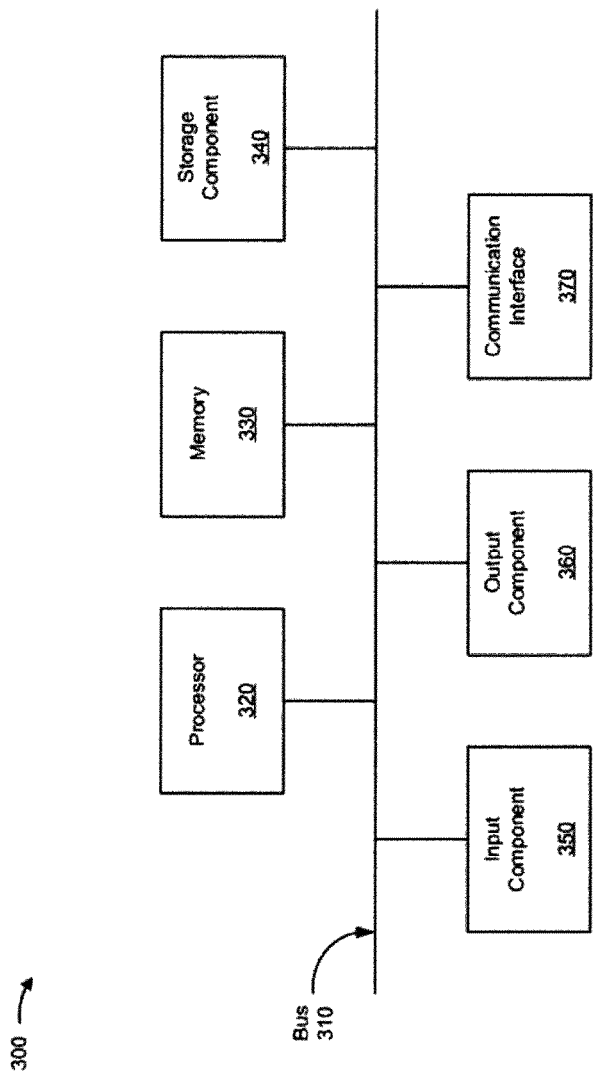
FIG. 31 is a diagram of example components of one or more devices of FIG. 31.

FIG. 31 is a diagram of example components of a device 300. Device 300 may correspond to user device 210, management platform 220, computing resource 224, data source 230, and/or entity server 240. In some implementations, user device 210, management platform 220, computing resource 224, data source 230, and/or entity server 240 may include one or more devices 300 and/or one or more components of device 300. As shown in FIG. 31, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on teprocessor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 31 are provided as an example. In practice, device 300 may include additional components, fewer components, different components, or differently arranged components than those shown in FIG. 31. Additionally, or alternatively, a set of components (e.g., one or more components) of device 300 may perform one or more functions described as being performed by another set of components of device 300.

In some implementations, management platform 220 may identify the subset of items based on a model. For example, management platform 220 may input a set of parameters associated with an item into a model, and determine whether the item is to be provided as a search result based on an output of the model. As examples, management platform 220 may input a similarity score, a trend score, a sentiment score, and/or the like, of an item into a model, and determine whether the item is to be provided as a search result based on an output of the model.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more processors to:
receive data inputs from data sources corresponding to raw weather data environmental data, and non-weather data;
generate targeted alerts based on the data inputs and transmit the targeted alerts to a second device associated with a user; and
wherein the one or more processors are further utilized to curate and perform normalization processes on the data inputs to extract key data elements and to inform and alert a meteorologist when additional raw weather, environmental data, and non-weather data critical in the forecasting of severe weather, environmental, and non-weather events affect the targeted alerts, the data sources comprising thresholds unique to a location of each user, including a) a time in advance of an identified severe weather, environmental, and non-weather event and b) a distance proximity of the identified event to determine whether risk locations are coincident with a user location and the threshold to generate the targeted alerts aided by the meteorologist.

2. The first device of claim 1, where the one or more processors are further utilized to display available information in a graphical format and allow for a situational awareness of the current state of the weather and the environment.

3. The first device of claim 1, where the data sources include one or more of the following: observed weather data sources, doppler radar, historical weather data sources, historical model runs and resulting forecasts, historical ensemble model runs and resulting forecasts, historical analog inputs, historical global/regional re-analyses/re-forecasts, patterns provided by meteorologists, datasets that represent the locations of the user or a physical asset of a user.

4. The first device of claim 1, wherein the data sources further comprise: c) a threshold breach of a qualifier to an identified event.

5. The first device of claim 4, where the weather data sources further comprise: doppler radar, historical model runs and resulting forecasts, patterns provided by meteorologists, and datasets that represent the locations of the user or a physical asset of a user.

6. The first device of claim 4, where the weather data sources further comprise: historical environmental data sources, observed weather data sources, and historical model runs and resulting forecasts.

7. The first device of claim 4, where the weather data sources further comprise: historical environmental data sources and observed weather data sources.

8. The first device of claim 4, where the data sources comprise: observed weather data sources, doppler radar, historical weather data sources, historical model runs and resulting forecasts, historical ensemble model runs and resulting forecasts, historical analog inputs, historical global/regional re-analyses/re- forecasts, patterns provided by meteorologists, and datasets that represent the locations of the user or a physical asset of a user.

9. The first device of claim 1, wherein the risk location is coincident with a present and possible future locations of the user.

10. A method, comprising:
receiving by a first device data inputs from data sources corresponding to raw weather, non-weather, and environmental data; and
generating targeted alerts based on the data inputs and transmitting the targeted alerts to a second device associated with a user; and
wherein the one or more processors are further utilized to curate and perform normalization processes on the data inputs to extract key data elements and to inform and alert a meteorologist when additional raw weather, environmental data, and non-weather data critical in the forecasting of severe weather, environmental, and non-weather events affect the targeted alerts, the data sources comprising thresholds unique to a location of each user, including a) a time in advance of an identified severe weather, environmental, and non-weather event and b) a distance proximity of the identified event to determine whether risk locations are coincident with a user location and the threshold to generate the targeted alerts aided by the meteorologist.

11. The method of claim 10, displaying available information in a graphical format and allow for a situational awareness of the current state of the weather and the environment.

12. The method of claim 10, where the data sources include one or more of the following: observed weather data sources, doppler radar, historical weather data sources, historical model runs and resulting forecasts, historical ensemble model runs and resulting forecasts, historical analog inputs, historical global/regional re- analyses/re-forecasts, patterns provided by meteorologists, datasets that represent the locations of the user or a physical asset of a user.

13. The first device of claim 10, wherein the data sources further comprise: c) a threshold breach of a qualifier to an identified event.

14. The first device of claim 13, wherein the weather data sources further comprise: doppler radar, historical model runs and resulting forecasts, patterns provided by meteorologists, and datasets that represent the locations of the user or a physical asset of a user.

15. The first device of claim 13, wherein the weather data sources further comprise: historical environmental data sources, observed weather data sources, and historical model runs and resulting forecasts.

16. The first device of claim 13, wherein the weather data sources further comprise: historical environmental data sources and observed weather data sources.

17. The first device of claim 13, wherein the data sources comprise:
observed weather data sources, doppler radar, historical weather data sources, historical model runs and resulting forecasts, historical ensemble model runs and resulting forecasts, historical analog inputs, historical global/regional re-analyses/re-forecasts, patterns provided by meteorologists, and datasets that represent the locations of the user or a physical asset of a user.

18. The first device of claim 10, wherein the risk location is coincident with a present and possible future locations of the user.

19. A non-transitory computer-readable medium storing instructions, the instructions comprising: one or more instructions that, when executed by one or more processors, cause the one or more processors to:
receive by a first device data inputs data inputs from data sources corresponding to raw weather, non-weather, and environmental data; and
generate targeted alerts based on the data inputs and transmit the targeted alerts to a second device associated with a user; and
wherein the one or more processors are further utilized to curate and perform normalization processes on the data inputs to extract key data elements and to inform and alert a meteorologist when additional raw weather, environmental data, and non-weather data critical in the forecasting of severe weather, environmental, and non-weather events affect the targeted alerts, the data sources comprising thresholds unique to a location of each user, including a) a time in advance of an identified severe weather, environmental, and non-weather event and b) a distance proximity of the identified event to determine whether risk locations are coincident with a user location and the threshold to generate the targeted alerts aided by the meteorologist.

20. The non-transitory computer-readable medium of claim 19, where one or more instructions that, when executed by one or more processors, cause the one or more processors to display available information in a graphical format and allow for a situational awareness of the current state of the weather and the environment.

21. The non-transitory computer-readable medium of claim 19, where the data sources include one or more of the following: observed weather data sources, doppler radar, historical weather data sources, historical model runs and resulting forecasts, historical ensemble model runs and resulting forecasts, historical analog inputs, historical global/regional re-analyses/re-forecasts, patterns provided by meteorologists, datasets that represent the locations of the user or a physical asset of a user.

22. The first device of claim 19, wherein the data sources further comprise: c) a threshold breach of a qualifier to an identified event.

23. The first device of claim 22, wherein the weather data sources further comprise: doppler radar, historical model runs and resulting forecasts, patterns provided by meteorologists, and datasets that represent the locations of the user or a physical asset of a user.

24. The first device of claim 22, wherein the weather data sources further comprise: historical environmental data sources and observed weather data sources.

25. The first device of claim 22, wherein the data sources comprise:
observed weather data sources, doppler radar, historical weather data sources, historical model runs and resulting forecasts, historical ensemble model runs and resulting forecasts, historical analog inputs, historical global/regional re-analyses/re-forecasts, patterns provided by meteorologists, and datasets that represent the locations of the user or a physical asset of a user.

26. The first device of claim 19, wherein the risk location is coincident with a present and possible future locations of the user.

* * * * *